(12) United States Patent
Roessler et al.

(10) Patent No.: US 10,582,125 B1
(45) Date of Patent: Mar. 3, 2020

(54) PANORAMIC IMAGE GENERATION FROM VIDEO

(71) Applicant: Amazon Technologies, Inc., Seattle, WA (US)

(72) Inventors: Ross David Roessler, Seattle, WA (US); Matthew Alan Townsend, Redwood City, CA (US); Yinfei Yang, Bellevue, WA (US); Jim Oommen Thomas, Seattle, WA (US); Deon Poncini, San Jose, CA (US); William Evan Welbourne, Seattle, WA (US); Geoff Hunter Donaldson, San Francisco, CA (US); Paul Aksenti Savastinuk, Shoreline, WA (US); Cheng-Hao Kuo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 14/727,782

(22) Filed: Jun. 1, 2015

(51) Int. Cl.
  *G03B 37/04* (2006.01)
  *H04N 5/232* (2006.01)
  *H04N 5/225* (2006.01)
  *G06T 7/00* (2017.01)

(52) U.S. Cl.
  CPC ....... *H04N 5/23238* (2013.01); *G06T 7/0085* (2013.01); *H04N 5/2258* (2013.01)

(58) Field of Classification Search
  None
  See application file for complete search history.

(56) References Cited

U.S. PATENT DOCUMENTS

| | | | | |
|---|---|---|---|---|
| 6,788,333 B1* | 9/2004 | Uyttendaele | ....... | H04N 5/23238 348/36 |
| 6,824,240 B2* | 11/2004 | Kusakabe | ............. | G06T 1/0028 347/15 |
| 7,639,877 B2* | 12/2009 | Shiota | ................ | G06K 9/00664 382/190 |
| 8,005,316 B1* | 8/2011 | Linburn | ............... | G11B 27/034 345/1.1 |
| 8,441,548 B1* | 5/2013 | Nechyba | ................ | H04N 5/228 348/222.1 |

(Continued)

OTHER PUBLICATIONS

T. Deselaers, P. Dreuw and H. Ney, "Pan, zoom, scan—Time-coherent, trained automatic video cropping," 2008 IEEE Conference on Computer Vision and Pattern Recognition, Anchorage, AK, 2008, pp. 1-8.*

(Continued)

*Primary Examiner* — Jayanti K Patel
*Assistant Examiner* — Stefan Gadomski
(74) *Attorney, Agent, or Firm* — Lee & Hayes, P.C.

(57) ABSTRACT

A video capture device may include multiple cameras that simultaneously capture video data. The video capture device and/or one or more remote computing resources may stitch the video data captured by the multiple cameras to generate stitched video data that corresponds to 360° video. The remote computing resources may apply one or more algorithms to the stitched video data to identify one or more frames that depict content that is likely to be of interest to a user. The video capture device and/or the remote computing resources may generate one or more images from the one or more frames, and may send the one or more images to the user.

20 Claims, 8 Drawing Sheets

(56) References Cited

U.S. PATENT DOCUMENTS

| | | | |
|---|---|---|---|
| 8,760,489 B1* | 6/2014 | Osher | H04N 7/147 348/14.01 |
| 9,305,214 B1* | 4/2016 | Young | G06K 9/00523 |
| 10,225,521 B2* | 3/2019 | Gorodetski | G06Q 30/04 |
| 2003/0103234 A1* | 6/2003 | Takabayashi | H04N 1/00132 358/1.15 |
| 2003/0142882 A1* | 7/2003 | Beged-Dov | G06K 9/3216 382/284 |
| 2004/0027451 A1* | 2/2004 | Baker | H04N 5/2259 348/46 |
| 2004/0093432 A1* | 5/2004 | Luo | G06T 3/4092 709/247 |
| 2005/0099494 A1* | 5/2005 | Deng | H04N 1/2112 348/36 |
| 2007/0172148 A1* | 7/2007 | Hawley | G06K 9/4633 382/281 |
| 2008/0106593 A1* | 5/2008 | Arfvidsson | G06T 3/0062 348/39 |
| 2008/0232707 A1* | 9/2008 | Lee | G06T 5/003 382/255 |
| 2008/0260347 A1* | 10/2008 | Widdowson | G11B 27/034 386/278 |
| 2009/0021576 A1* | 1/2009 | Linder | G03B 37/00 348/36 |
| 2009/0058988 A1* | 3/2009 | Strzempko | G06T 3/4038 348/36 |
| 2009/0079844 A1* | 3/2009 | Suzuki | G03B 13/36 348/222.1 |
| 2009/0231441 A1* | 9/2009 | Walker | G06F 17/30265 348/207.1 |
| 2009/0251594 A1* | 10/2009 | Hua | G06T 11/00 348/441 |
| 2010/0073402 A1* | 3/2010 | Delia | G06T 11/60 345/625 |
| 2010/0097442 A1* | 4/2010 | Lablans | G03B 5/00 348/36 |
| 2010/0097444 A1* | 4/2010 | Lablans | G03B 35/00 348/46 |
| 2010/0226534 A1* | 9/2010 | Doria | G06K 9/3241 382/103 |
| 2011/0032373 A1* | 2/2011 | Forutanpour | G11B 27/034 348/222.1 |
| 2011/0096228 A1* | 4/2011 | Deigmoeller | G06K 9/00624 348/441 |
| 2011/0115950 A1* | 5/2011 | Wach | H04N 5/335 348/241 |
| 2011/0188726 A1* | 8/2011 | Nathaniel | G01N 23/04 382/132 |
| 2011/0216179 A1* | 9/2011 | Dialameh | G06F 17/30247 348/62 |
| 2011/0234640 A1* | 9/2011 | Ishida | G06K 9/00221 345/671 |
| 2011/0310263 A1* | 12/2011 | Pien | H04N 5/23235 348/222.1 |
| 2012/0027304 A1* | 2/2012 | Brown | G06K 9/00369 382/190 |
| 2012/0062732 A1* | 3/2012 | Marman | H04N 7/18 348/142 |
| 2012/0087640 A1* | 4/2012 | Kitamura | G11B 27/034 386/281 |
| 2012/0198337 A1* | 8/2012 | Flint | G11B 27/34 715/723 |
| 2012/0229596 A1* | 9/2012 | Rose | G06T 3/4038 348/36 |
| 2012/0293607 A1* | 11/2012 | Bhogal | G06T 3/4038 348/36 |
| 2012/0293613 A1* | 11/2012 | Powers | H04N 5/23238 348/36 |
| 2012/0294549 A1* | 11/2012 | Doepke | G06T 3/4038 382/294 |
| 2013/0070973 A1* | 3/2013 | Saito | G06K 9/00228 382/118 |
| 2013/0108175 A1* | 5/2013 | Ptucha | G06T 11/60 382/199 |
| 2013/0114002 A1* | 5/2013 | Carlsson | H04N 5/44 348/725 |
| 2013/0141523 A1* | 6/2013 | Banta | H04N 5/23238 348/36 |
| 2013/0147845 A1* | 6/2013 | Xie | G06F 3/14 345/660 |
| 2013/0229529 A1* | 9/2013 | Lablans | H04N 5/23238 348/169 |
| 2013/0293671 A1* | 11/2013 | Gorstan | H04N 5/23238 348/36 |
| 2014/0028792 A1* | 1/2014 | Abe | H04N 5/23238 348/37 |
| 2014/0075382 A1* | 3/2014 | Cheng | G06F 3/0482 715/810 |
| 2014/0118479 A1* | 5/2014 | Rapoport | H04N 1/00183 348/36 |
| 2014/0184803 A1* | 7/2014 | Chu | G06T 7/292 348/159 |
| 2014/0270533 A1* | 9/2014 | Chedeau | G06K 9/3233 382/195 |
| 2014/0327940 A1* | 11/2014 | Amtrup | H04N 1/00251 358/473 |
| 2014/0347439 A1* | 11/2014 | Jia | H04N 5/23238 348/36 |
| 2015/0052475 A1* | 2/2015 | Rapoport | G06T 11/60 715/790 |
| 2015/0070523 A1* | 3/2015 | Chao | H04N 5/23216 348/218.1 |
| 2015/0071547 A1* | 3/2015 | Keating | G06K 9/46 382/195 |
| 2015/0077512 A1* | 3/2015 | Clement | H04N 5/23206 348/36 |
| 2015/0146010 A1* | 5/2015 | Yokozeki | G06K 9/00228 348/169 |
| 2015/0149960 A1* | 5/2015 | Song | G06F 3/04845 715/810 |
| 2015/0156416 A1* | 6/2015 | Filip | H04N 5/23238 348/36 |
| 2015/0156419 A1* | 6/2015 | Aggarwal | H04N 5/23222 348/208.1 |
| 2015/0161450 A1* | 6/2015 | Kumar | G06K 9/00751 382/197 |
| 2015/0170336 A1* | 6/2015 | Lapointe | G06T 3/403 382/298 |
| 2015/0172603 A1* | 6/2015 | Gorodetski | G06Q 30/04 348/61 |
| 2015/0262341 A1* | 9/2015 | Nash | H04N 5/23229 348/208.6 |
| 2016/0026855 A1* | 1/2016 | Mazumdar | H04N 7/181 348/143 |
| 2016/0063705 A1* | 3/2016 | Xu | G06T 5/50 382/199 |
| 2016/0066781 A1* | 3/2016 | Thompson | G06T 7/0012 600/476 |
| 2016/0086302 A1* | 3/2016 | Yim | G06T 3/40 382/255 |
| 2016/0105649 A1* | 4/2016 | Pettegrew | G06T 7/80 348/37 |
| 2016/0165309 A1* | 6/2016 | Van Brandenburg | H04N 21/4728 725/116 |
| 2016/0173749 A1* | 6/2016 | Dallas | H04N 5/2352 348/208.6 |
| 2016/0277651 A1* | 9/2016 | Sherman | H04N 5/2259 |
| 2016/0337706 A1* | 11/2016 | Hwang | H04N 21/23614 |
| 2016/0353018 A1* | 12/2016 | Anderson | H04N 5/23238 |

OTHER PUBLICATIONS

L. Wolf, M. Guttmann and D. Cohen-Or, "Non-homogeneous Content-driven Video-retargeting," 2007 IEEE 11th International Conference on Computer Vision, Rio de Janeiro, 2007, pp. 1-6.*

(56) References Cited

OTHER PUBLICATIONS

T. Yokoi and H. Fujiyoshi, "Virtual camerawork for generating lecture video from high resolution images," 2005 IEEE International Conference on Multimedia and Expo, 2005, pp. 4 pp.-.*

Y. Ariki, Tetsuya Takiguchi and Kazuki Yano, "Digital camera work for soccer video production with event recognition and accurate ball tracking by switching search method," 2008 IEEE International Conference on Multimedia and Expo, Hannover, 2008, pp. 889-892.*

Gaddam et al. "Be your own cameraman: real-time support for zooming and panning into stored and live panoramic video". 2014 Proceedings of the 5th ACM Multimedia Systems Conference, Singapore, pp. 168-171.*

Xinding Sun, J. Foote, D. Kimber and B. S. Manjunath, "Region of interest extraction and virtual camera control based on panoramic video capturing," in IEEE Transactions on Multimedia, vol. 7, No. 5, pp. 981-990, Oct. 2005.*

Liu et al. "Video Retargeting: Automating Pan and Scan" In Proceeding of the 14$^{th}$ ACM International Conference on Multimedia, pp. 241-250. ACM, 2006.*

Y. Ariki, S. Kubota and M. Kumano, "Automatic Production System of Soccer Sports Video by Digital Camera Work Based on Situation Recognition," Eighth IEEE International Symposium on Multimedia (ISM'06), San Diego, CA, 2006, pp. 851-860. (Year: 2006).*

Gaddam, Vamsidhar & Langseth, Ragnar & Ljødal, Sigurd & Gurdjos, Pierre & Charvillat, Vincent & Griwodz, Carsten & Halvorsen, Pål. (2014). Interactive Zoom and Panning from Live Panoramic Video. Proceedings of the 24th ACM Workshop on Network and Operating Systems Support for Digital Audio and Video (Year: 2014).*

* cited by examiner

PANORAMIC IMAGE GENERATION FROM VIDEO

BACKGROUND

Panoramic images may be captured via a camera using a specific camera setting. Alternatively, or in addition, a panoramic image may be obtained by capturing an image while moving the camera in a horizontal direction. However, panoramic images captured using a still image camera or a video camera may be uneven, may be of poor quality, and/or may include unintended objects and/or persons that were present within a field of view of the camera when the panoramic images were captured. Accordingly, a user may be displeased with the quality and/or content of a particular panoramic image, which may result in a poor user experience. This leads to the possibility of new technology enabling novel systems and techniques for generating panoramic images that are likely to be of interest to consumers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The systems and/or processes described herein may generate a panoramic image from video data captured by multiple cameras of a video capture device. More particularly, unlike existing cameras, the systems and/or processes described herein correspond to a video capture device having multiple cameras (e.g., four cameras) that each simultaneously capture video data of the surrounding environment. As a result, instead of capturing video data of a single field of view, such as a field of view in which the camera is facing, each of the multiple cameras of the video capture device described herein may simultaneously capture video data corresponding to multiple, different fields of view. Accordingly, provided that the video capture device included four different cameras that each capture video data, the video capture device may be configured to capture up to a 360° video and/or a 360° image.

Upon the multiple cameras capturing the video data, the video capture device and/or one or more remote computing resources (e.g., a server device) may stitch together the video data. That is, provided that four cameras simultaneously captured four streams of video data, the video data may be stitched together to generate a 360° video that represents the environment surrounding the video capture device. The systems and/or processes described herein may then apply one or more algorithms to the stitched video data in order to determine candidate frames of the stitched video data that are most likely of interest to a user associated with the video capture device. The algorithms may seek to identify persons, objects, scenes (e.g., a beach, mountains, etc.), etc., that are likely to be of interest to the user. One of the candidate frames may then be selected based on the identified objects, persons, scenes, etc. to serve as a source of a subsequently generated panoramic image.

Upon determining a particular frame, the systems and/or processes described herein may apply one or more additional algorithms to the frame. For instance, the algorithms may determine locations in the frame that will serve as the endpoints of the panoramic image. Upon determining that the horizon of the video is uneven, the algorithms may manipulate the frame such that the horizon of the frame is level. The algorithms may also determine whether certain individuals and/or objects depicted in the frame should or should not be included in the panoramic image. After processing the frame utilizing the algorithm(s), the systems and/or processes described herein may generate the panoramic image that is to be presented to the user. Provided that the user provided feedback relating to the panoramic image (e.g., the user liked/disliked the image, the user requested changes to the image, the user requested a different image, etc.), the systems and/or processes described herein may adjust variables, weights, etc., of the algorithms as a result.

Figure 1:
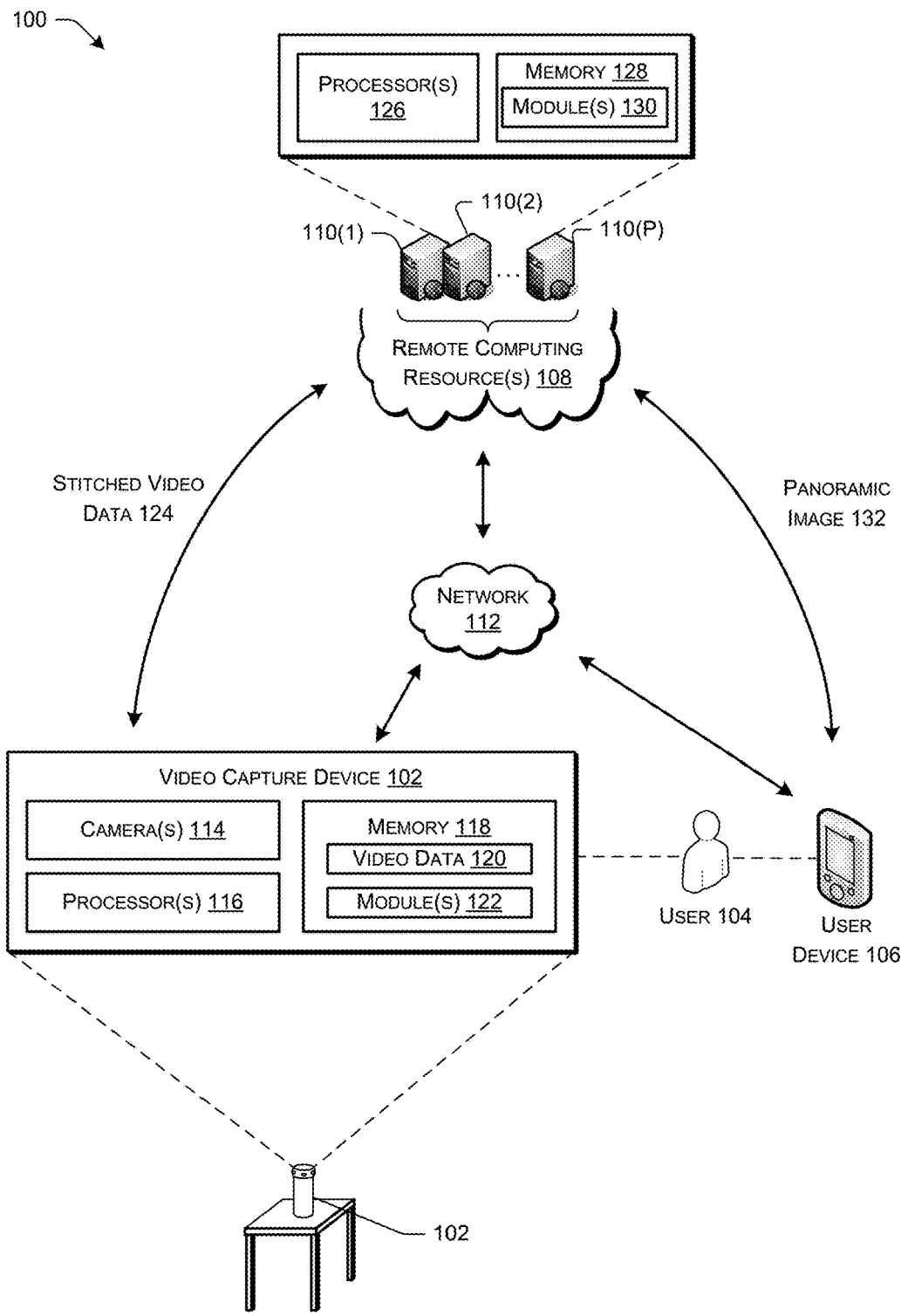
FIG. 1 illustrates an example system for generating a panoramic image based on video data captured by multiple cameras of a video capture device.

FIG. 1 illustrates an example system 100 that is configured to generate panoramic images from video data captured from multiple cameras of a video capture device 102 (interchangeably referred to as "device"). The video capture device 102 may be included in an environment, such as a home environment, as illustrated in FIG. 1, or in any other environment (e.g., an outdoors environment). The video capture device 102 may be placed in a fixed location within the environment, such as on a table, or may be carried by a user 104. For the purposes of this discussion the size of the video capture device 102 illustrated in FIG. 1 is not necessarily representative of its actual physical size. In various embodiments, the user 104 may have one or more other user devices 106, which may be used to perform various operations. Here, the user device 106 may be utilized by the user 104 to receive panoramic images generated by the system 100. In addition to the video capture device 102, the system 100 may include one or more remote computing resource(s) 108, which may be implemented as one or more servers 110(1), 110(2), . . . , 110(P), and one or more networks 112.

As illustrated in FIG. 1, the video-capture device 102 may include at least one or more cameras 114, one or more processors 116, and memory 118. The memory 118 may store video data 120 captured by the cameras 114 and one or more modules 122 that perform various operations. In various embodiments, each of the cameras 114 of the video capture device 102 may capture video data 120, such as a stream of video, as well as still images. For instance, provided that the video-capture device 102 included four different cameras 114, each of the four cameras 114 may capture a different video stream corresponding to a field of view. The cameras 114 may be positioned on each side of the video capture device 102, such that each camera 114 is positioned 90° with respect to its adjacent cameras 114 (e.g., cameras 114 to the left and the right). That is, a first axis in which a first camera 114 is oriented may be approximately 90° from a second axis in which adjacent cameras 114 are oriented. Since the field of view of a first camera 114 may overlap with the field of views of adjacent cameras 114, the multiple cameras 114 of the video capture device 102 may capture 360° of video, which will be discussed in additional detail with respect to FIG. 2. Moreover, instead of the video capture device 102 including multiple cameras 114, the video capture device 102 may capture 360° video using a single camera 114 that rotates about the video capture device 102 at a high rate/speed.

The cameras 114 of the video capture device 102 may capture video data 120 of the environment surrounding the video capture device 102. The video capture device 102 may be set on a surface within an environment, which may allow the multiple cameras 114 to capture video of the environment. For instance, the video capture device 102 may be set on a table within a room of a home to capture video of activity (e.g., a birthday party) taking place within the room. Due to multiple cameras 114 simultaneously capturing video, the video capture device 102 may capture video in multiple different directions, thereby capturing video of an entirety of the events taking place within the room, provided that those events are within the field of view of at least one of the cameras 114. The video capture device 102 may also be held by the user 104, or may be affixed the user 104 in some manner (e.g., via a strap, a clip, a platform, etc.). Accordingly, as the user 104 moves within an environment (e.g., a room, the beach, a hike in the mountains, etc.), the video capture device 102 may capture video of events occurring within that environment. The cameras 114 may continuously capture video, or may begin/cease capturing video in response to user input (e.g., actuating a button, a voice command, etc.).

As stated above, the video data 120 may represent video captured by each of the multiple cameras 114 of the video capture device 102. The one or more modules 122 of the video capture device 102 may include software and/or other functionality that may stitch together the video data 120 captured by the multiple cameras 114. That is, provided that the video data 120 is captured by four different cameras 114, the modules 122 may stitch video data 120 captured by a first camera 114 with the video data 120 captured by cameras 114 adjacent to the first video camera 114. As a result, stitching of the video data 120 may result in stitched video data 124, where the stitched video data 124 is 360° video that depicts the environment surrounding the video capture device 102. The stitching of the video data 120 may also be performed by the remote computing resources 108, or by a combination of the video capture device 102 and the remote computing resources 108, and is discussed in additional detail with respect to FIG. 2.

In other embodiments, the modules 122 may include speech recognition software or other speech recognition functionality. The video capture device 102 may include one or more microphones that detect voice commands uttered by the user 104 and that generate one or more audio signals corresponding to the voice commands. The speech recognition software may process the audio signals to recognize words included within the voice command. As a result, the video capture device 102 may recognize voice commands uttered by the user 104 (e.g., start recording video, stop recording video, take a photograph, etc.) and perform corresponding operations as a result (e.g., instruct the cameras 114 to record video, instruct the cameras 114 to cease recording video, instruct the cameras 114 to capture a still image, etc.). The video capture device 102 may include one or more user interfaces (e.g., graphical user interfaces) and/or one or more speakers that allow the video capture device to visually and/or audibly output information to the user 104, which may allow the user 104 to interact with the video capture device 102.

In some instances, the video capture device 102 may operate in conjunction with or may otherwise utilize computing resources that are remote from the video capture device 102 (i.e., the remote computing resources 108). For instance, the video capture device 102 may couple to the remote computing resources 108 over the network 112. As illustrated, and as set forth above, the remote computing resources 108 may be implemented as one or more servers 110(1), 110(2), . . . , 110(P) and may, in some instances, form a portion of a network-accessible computing platform implemented as a computing infrastructure of processors 126, storage (e.g., memory 128), software (e.g., modules 130), data access, and so forth that is maintained and accessible via the network 112, such as the Internet. The remote computing resources 108 may not require end-user knowledge of the physical location and configuration of the system that delivers the services. Common expressions associated for these remote computing resources 108 may include "on-demand computing", "software as a service (SaaS)", "platform computing", "network-accessible platform", "cloud services", "data centers", and so forth.

The servers 110(1)-(P) may include the processor 126 and the memory 128, which may include one or more modules 130 and which may store or otherwise have access to some or all of the components described with reference to the memory 118 of the video capture device 102. For instance, the memory 128 may have access to and utilize the modules 122 that perform video stitching and/or speech recognition operations. In some examples, the video capture device 102 may upload the video data 120 and/or the stitched video data 124 to the remote computing resources 108 for processing, given that the remote computing resources 108 may have a computational capacity that exceeds the computational capacity of the video capture device 102. Therefore, the video capture device 102 may utilize the functionality of the remote computing resources 108 for performing relatively complex analysis on video data 120 captured from the environment.

Alternatively, or in addition to the video capture device 102 stitching the video data 120 to generate the stitched video data 124, the video capture device 102 may transmit the raw video data 120 captured by the multiple cameras 114 to the remote computing resources 108. The remote computing resources 108 may then stitch together the video data to generate the stitched video data 124.

The video capture device 102, the user device 106, and/or the remote computing resources 108 may communicatively couple to the network 112 via wired technologies (e.g., wires, USB, fiber optic cable, etc.), wireless technologies (e.g., RF, cellular, satellite, Bluetooth, etc.), or other connection technologies. The network 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Regardless of whether the video stitching occurs locally on the video capture device 102 and the stitched video data 124 is transmitted to the remote computing resources 108, or whether the video stitching is performed remotely from the video capture device 102 (e.g., the video data 120 is sent to the remote computing resources 108 via the network 112 for stitching), the remote computing resources 108 may further process the stitched video data 124. More particularly, the remote computing resources 108, and in particular, the one or more modules 130, may apply, run, and/or execute one or more algorithms or classifiers with respect to the stitched video data 124 to identify one or more candidate frames of the stitched video data 124. The candidate frames may include frames of video that are determined to likely be of interest to the user 104. For instance, the algorithms may include human detection or object detection algorithms to identify people (e.g., the user 104 or friends, family, etc., of the user 104) and/or objects (e.g., a house, a ball, etc.) depicted in the frames of the stitched video data 124. The algorithms may also include face detection or smile detection algorithms to identify persons depicted within frames of the stitched video data 124 and whether those persons are smiling. In addition, the algorithms may include scene detection algorithms to determine scenes depicted within frames of the stitched video data 124, such as a beach scene, a forest scene, a home environment, and so on. The algorithms may also include background detection algorithms that determine the background depicted within the frames of the stitched video data 124. As a result, the remote computing resources 108 may execute the above algorithms to select a candidate frame that is likely to be of interest to the user 104.

Upon selecting the candidate frame, the one or more modules 130 of the remote computing resources 108 may apply, run, or execute one or more additional algorithms with respect to the selected frame in order to generate a panoramic image 132 to be provided to the user 104. Although the term "panoramic image" is used herein, it is contemplated that any still image may be generated from the stitched video data 124. In particular, the remote computing resources 108 may generate the panoramic image 132 from content that is depicted in the selected frame of the stitched video data 124. The additional algorithms may include edge detection algorithms that determine the endpoints of the panoramic image 132. Moreover, such algorithms may include horizon leveling algorithms that help ensure that the horizon/background of the panoramic image 132 is level, as opposed to being uneven or wavy. The additional algorithms may also identify a person or groups of persons depicted in the selected frame and determine a location in which the person(s) should be positioned in the panoramic image 132 (e.g., in the center, towards one side, towards the top/bottom, etc.).

Therefore, from the video data 120 captured by the multiple cameras 114 of the video capture device 102, the remote computing resources 108 may generate a panoramic image 132 that depicts content that is likely to be of interest to the user 104 associated with the video capture device 102. The remote computing resources 108 may transmit the panoramic video 132 to the user device 106 (e.g., a cellular telephone, a laptop computing device, a tablet device, or any other device capable of receiving the panoramic image) associated with the user 104 via the network 112. The panoramic image 132 may be sent via an e-mail message, a text message, via a website, or in any other manner. In some embodiments, the panoramic image 132 may be sent to a user device 106 associated with a user profile and/or a user account associated with the user 104. Moreover, for the purposes of this discussion, the term user 104 may also be referred to "user profile" or "user account," and vice versa. The video capture device 102 may also be associated with the user account/user profile associated with the user 104. Moreover, a particular user account may be associated with multiple user profiles. For instance, a particular user account may be associated with an adult user profile, a child user profile, a teen user profile, and so on.

Upon receiving the panoramic image 132, the user 104 may use the panoramic image 132 in any manner, or may provide feedback regarding the panoramic image 132. For instance, the user 104 may indicate that he/she likes or dislikes the panoramic image 132, would like a different panoramic image 132, or would like the panoramic image 132 to be modified in some manner. The remote computing resources 108 may provide a new panoramic image 132 or modify the previously provided panoramic image 132 as a result. Based on the feedback, the remote computing resources 108 may also modify one or more variables, weights, etc., of the one or more algorithms utilized to identify frames of the stitched video data 124 and to generate the panoramic image 132. The remote computing resources 108 may do so in order to increase the likelihood that subsequent panoramic images 132 generated by the remote computing resources 108 are likely to be of interest to the user 104.

Although stitched video data 124 and a panoramic image 132 are described herein, the remote computing resources 108 may instead generate a non-panoramic image from video data 120 that has not been stitched with other video data 120. That is, the video capture device 102 may capture 360° video data 120 without having to stitch video data 120 from multiple different cameras 114. The remote computing resources 108 may generate the image that is provided to the user 104 by processing the 360° video data 120.

Figure 2:
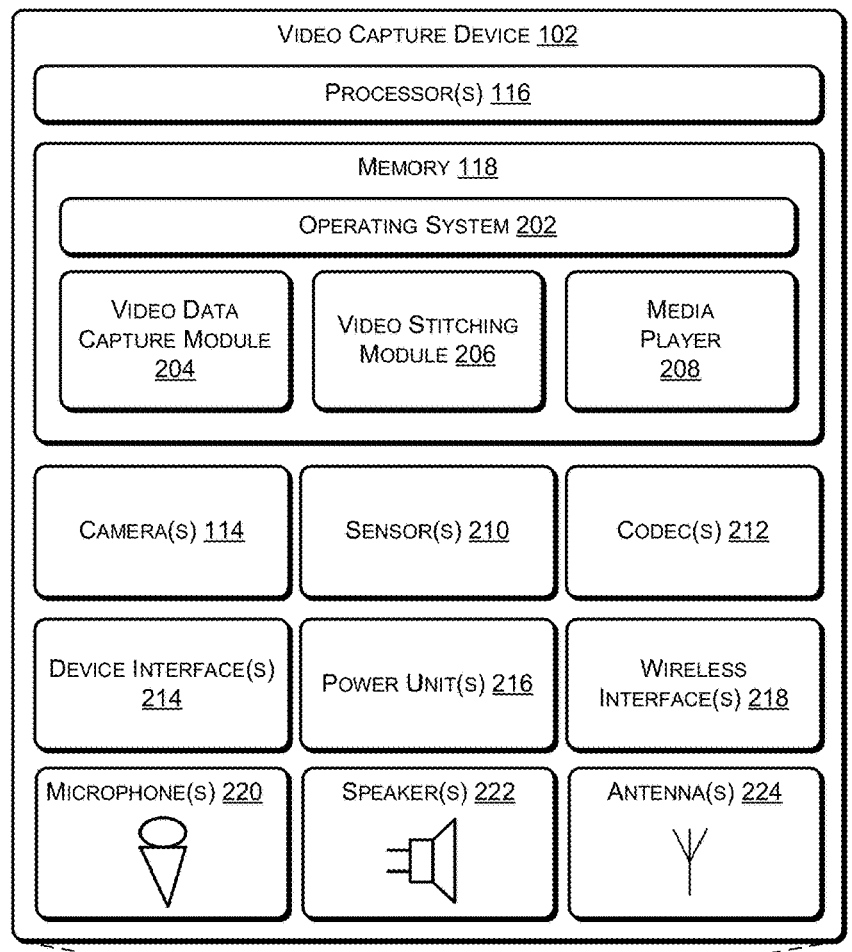
FIG. 2 illustrates an example device that includes multiple cameras configured to capture video data used to generate panoramic images.
Figure 2:
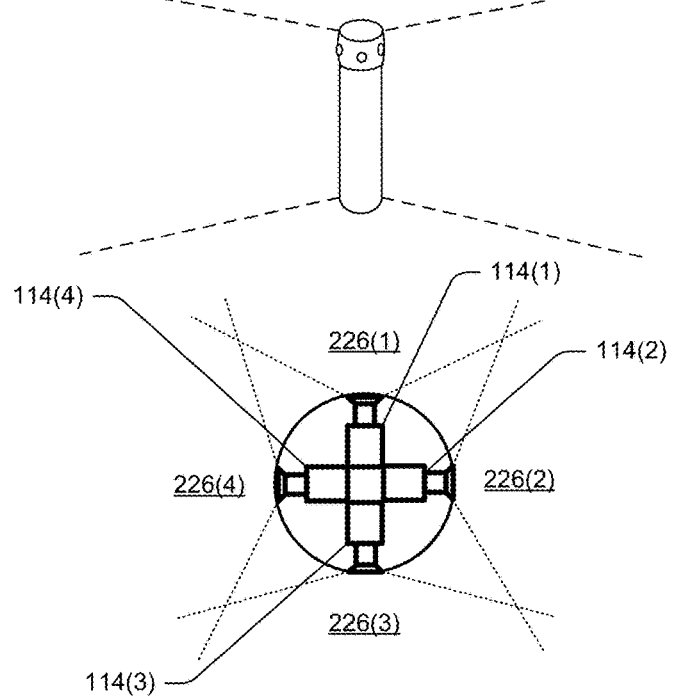

FIG. 2 shows selected functional components and/or modules of one implementation of the video capture device 102 in additional detail. Generally, the video capture device 102 may be implemented as a standalone device that may be relatively simple or complex in terms of functional capabilities with input/output components, memory, and processing capabilities. For instance, the video capture device 102 may or may not have a keyboard, keypad, or other form of mechanical input in some implementations. The video capture device 102 may or may not have a display or touch screen to facilitate visual presentation and user touch input. Moreover, the video capture device 102 may be implemented with the ability to receive and output audio, video, and/or visual data, a network interface (wireless or wire-based), power, and processing/memory capabilities. As set forth above with respect to FIG. 1, the video capture device 102 may include multiple cameras 114 that capture video data 120 that is used to generate panoramic images 132.

In the illustrated implementation, the video capture device 102 may include the processor(s) 116 and the memory 118. In various embodiments, the processor(s) 116 may execute one or more modules and/or processes to cause the video capture device 102 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. The processor 116 may include multiple processors 116 and/or a single processor 116 having multiple cores.

The memory 118 may include computer-readable storage media ("CRSM"), which may be any available physical media accessible by the processor(s) 116 to execute instructions stored on the memory 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 116. As will be discussed in additional detail, the memory 118 may include an operating system 202, one or more modules 122, such as a video capture module 204 and a video stitching module 206, and a media player 208.

In addition to the processor(s) 116 and the memory 118, the video capture device 102 may include multiple cameras 114. For instance, as described in additional detail below, the video capture device 102 may include four cameras 114 that are positioned on/within the video capture device 102 90° from one another. Each of the multiple cameras 114 may capture video data 120, such as a video stream, within its corresponding field of view. As a result, by the four cameras 114 simultaneously capturing video, the video capture device 102 may capture 360° of video surrounding the video capture device 102. For the purposes of this discussion, the cameras 114 may include any type of camera 114 (e.g., high definition (HD) camera) that is capable of capturing video and/or images (e.g., still images, panoramic images, etc.). Additionally, while this disclosure primarily discusses embodiments utilizing four cameras 114, it should be appreciated that some embodiments can utilize fewer (e.g., 1, 2, or 3) or more (e.g., 5, 6, 8, 10, and so on) cameras 114.

The video capture device 102 may also include one or more sensors 210, codecs 212, device interfaces 214, power units 216, wireless interfaces 218, microphones 220, speakers 222, and antennas 224. For instance, the sensors 210 may include a motion detector to determine/measure the motion and/or the velocity of motion (e.g., speed, rate, etc.) of the video capture device 102, a location sensor (e.g., GPS sensor) to determine the position/physical location of the video capture device 102, an accelerometer to determine the acceleration of movement of the video capture device 102, an inertial measurement unit (IMU) to determine the velocity and orientation of the video capture device, a gyroscope to determine or maintain the orientation of the video capture device 102, an altimeter/altitude meter to determine the altitude of the video capture device 102, a compass to determine the orientation/direction of the video capture device 102, and/or any other type of sensor 210 utilized to determine the motion, velocity, acceleration, orientation, tilt, etc., of the video capture device 102.

In addition, the video capture device 102 may include one or more codecs 212 that are coupled to the microphone(s) 220 and/or the speaker(s) 222 to encode and/or decode audio signals generated by the microphone(s) 220. The codec(s) 212 may convert audio data and/or video data between different formats.

One or more device interfaces 214 (e.g., USB, broadband connection, etc.) may further be provided as part of the video capture device 102 to facilitate a wired connection to a network, such as network 112, or a plug-in network device that communicates with other wireless networks. Moreover, one or more power units 216 may further be provided to distribute power to the various components of the video capture device 102. The power unit(s) 216 may include hardware that enables the video capture device 102 to be plugged into an outlet, thereby providing power to the video capture device 102. Alternatively, or in addition, the power unit(s) 216 may correspond to one or more batteries (rechargeable or not) that may provide power to the video capture device 102. Provided that the video capture device 102 includes one or more batteries, the video capture device 102 may be carried and used by the user 104 while he/she moves between different locations.

In the illustrated example, the video capture device 102 may include one or more wireless interfaces 218 coupled to one or more antennas 224 to facilitate a wireless connection to a network (e.g., network 112). The wireless interface 218 may implement one or more of various wireless technologies, such as Wi-Fi, Bluetooth, radio frequency (RF), and so on.

The video capture device 102 may include a microphone unit that comprises one or more microphones 220 to receive audio input. The microphone(s) 220 of the video capture device 102 may detect audio data from the environment 102, such as sounds uttered by the user 104 and/or other ambient noise within the environment (e.g., birds chirping, waves crashing, voices, etc.). The microphones 220 may further generate audio signals that are representative of the audio data captured by the microphone(s) 220. In some embodiments, the microphone(s) 220 of the video capture device 102 may detect audio commands uttered by the user 104, which may include audible instructions for the video capture device 102 to power on, begin recording video, stop recording video, and so on. The video capture device 102 may also include a speaker unit that includes one or more speakers 222 to output audio sounds. Such audio sounds may be responsive to the audio commands uttered by the user 104, or may provide various types of information to the user 104.

Therefore, the user 104 of the video capture device 102 may interact with the video capture device 102 by speaking to it, and the microphone(s) 220 may capture sound and generate an audio signal that includes the user speech. The codec(s) 212 may encode the user speech and transfer that audio data to other components. The video capture device 102 can communicate back to the user 104 by emitting audible statements through the speaker(s) 222. In this manner, the user 104 may interact with the video capture device 102 simply through speech, without use of a keyboard or display common to other types of devices.

However, the video capture device 102 may include other user interface (UI) components that enable user interaction with the video capture device 102. For instance, the video capture device 102 may include haptic input devices, such as navigation buttons, keypads, joysticks, keyboards, touch screens, and the like. Furthermore, the video capture device 102 may include a display for text, graphical, or other visual output. The video capture device 102 may also include non-input control mechanisms, such as basic volume control button(s) for increasing/decreasing volume, buttons to cause the cameras 114 of the video capture device 102 to start and stop recording video data 120, buttons to adjust parameters (e.g., resolution, zoom, etc.) associated with the cameras 114, as well as power and reset buttons. There may also be one or more simple light elements (e.g., LEDs around perimeter of a top portion of the device 106) to indicate a state such as, for example, when power is on or to indicate that the video capture device 102 is currently capturing video of the surrounding environment. Though, in some instances, the video capture device 102 may not use or need to use any input devices or displays in some instances.

In various embodiments, the memory 118 of the video capture device 102 may include the operating system 202. In some instances, the operating system 202 may be configured to manage hardware and services (e.g., device interface(s) 214, wireless interface(s) 218, codec(s) 212, etc.) within, and coupled to, the video capture device 102 for the benefit of other modules. Moreover, the media player 208 may function to output any type of content on any type of output component of the video capture device 102. For instance, the media player 208 may output audio via the speaker(s) 222 and/or video or other visual information via a display of the video capture device 102. For instance, the user 104 may interact (e.g., audibly, via other user input, etc.) with the video capture device 102 to instruct the media player 208 to cause output of audio (e.g., audio of a video), and/or a video or an image captured by the cameras 114.

In addition, the memory 118 may include the video capture module 204 and the video stitching module 206. Also, some or all of the components, modules, hardware, etc., may reside additionally or alternatively at the remote computing resources 108. In various embodiments, the video data capture module 204 may cause the multiple cameras 114 of the video capture device 102 to capture video data 120 of the surrounding environment. That is, assume that the video capture device 102 includes four different cameras 114—a first camera 114, a second camera 114, a third camera 114, and a fourth camera 114. The video data capture module 204, may cause the first camera 114 capture first video data 120, the second camera 114 to capture second video data 120, the third camera 114 to capture third video data 120, and the fourth camera 114 to capture fourth video data 120. As a result, the video capture device 102 may capture four, and possibly more, video streams simultaneously.

Due to the multiple cameras 114 of the video capture device 102 having overlapping fields of view, the video stitching module 206 may stitch together the video data 120 captured by the cameras 114 to generate the stitched video data 124, where the stitched video data 124 corresponds to 360° video. In various embodiments, the video capture device 102 may transmit the raw video data 120 captured by the cameras 114 to the remote computing resources 108, which may then stitch the video data 120. However, the video stitching module 106 residing on the video capture device 102 may first stitch together the video data 120 and then transmit the stitched video data 124 to the remote computing resources 108 for additional processing.

The video stitching module 206 may stitch the individual video streams such that video streams corresponding to a first camera 114 are stitched to video streams corresponding to the two cameras 114 that are adjacent to the first camera 114. Each video stream, or even each frame within the video stream, may have metadata that includes various types of information about the video stream/frame. For instance, the metadata may indicate the specific camera 114 that captured the video stream. In addition, each frame of the video stream may include a time stamp indicating a time in which the frame was captured. As a result, the video stitching module 206 may stitch together the appropriate video streams (e.g., video streams from cameras 114 adjacent to one another).

The video stitching module 206 may also be able to stitch together the appropriate frames of the video streams to one another, such that frames having the same time stamps are stitched to one another.

For the purposes of this discussion, video stitching may correspond to the process of combining multiple video streams having overlapping fields of view to produce a single video stream. The video stitching module 206 may utilize various types of video stitching software and/or video stitching algorithms to stitch the video streams to one another. In various embodiments, the independent video streams may be of varying quality, color, lighting, contrast, etc., and may not require exact overlap in order to be stitched. Upon stitching the video streams to each other, any seams between the video streams of the stitched video (i.e., stitched video data 124) may not be apparent, or at least may be minimal.

FIG. 2 further illustrates the video capture device 102 having four different cameras 114—a first camera 114(1), a second camera 114(2), a third camera 114(3), and a fourth camera 114(4). In various embodiments, the four cameras 114 are positioned on the video capture device 102 such that they are 90°, or approximately 90°, from one another. For instance, the first camera 114(1) and the third camera 114(3) may be associated with a first axis that is 90° from a second axis associated with the second camera 114(2) and the fourth camera 114(4). As a result, each of the four cameras 114 captures video in a different direction.

In addition, each of the four cameras 114 has a corresponding field of view 226. The field of view 226 for a particular camera 114 may correspond the portion of the environment surrounding the video capture device 102 that is visible to that camera 114 when the camera 114 is positioned at a particular position and orientation. First objects within the field of view 226 of a camera 114 may be depicted within video captured by that camera 114, while second objects outside of that field of view 226 will not be depicted in that video, although such second objects may be included in the field of view 226 of a different camera 114 of the video capture device 102. Moreover, the field of view 226 of a camera 114 of the video capture device 102 may change in response to movement (e.g., vertical movement, horizontal movement, rotation, etc.) of the video capture device 102.

As shown in FIG. 2, each of the cameras 114 may have a corresponding field of view 226, such that the first camera 114 has a first field of view 226(1), the second camera 114(2) has a second field of view 226(2), the third camera 114(3) has a third field of view 226(3), and the fourth camera 114(4) has a fourth field of view 226(4). As shown, the field of views 226 of adjacent cameras 114 of the video capture device 102 may overlap. For instance, the field of view 226(1) of the first camera 114(1) overlaps with the second field of view 226(2) of the second camera, and overlaps with the fourth field of view 226(4) of the fourth camera 114(4). Therefore, certain objects included in the first field of view 126(1) of the first camera 114(1) may also be included in the second field of view 126(2) of the second camera 114(2) or in the fourth field of view 126(4) of the fourth camera 114(4), and vice versa. As a result, the cameras 114 of the video capture device 102 are able to capture video in multiple different directions, which allows the stitched video data 124 to represent a 360° video of the environment surrounding the video capture device 102.

Figure 3:
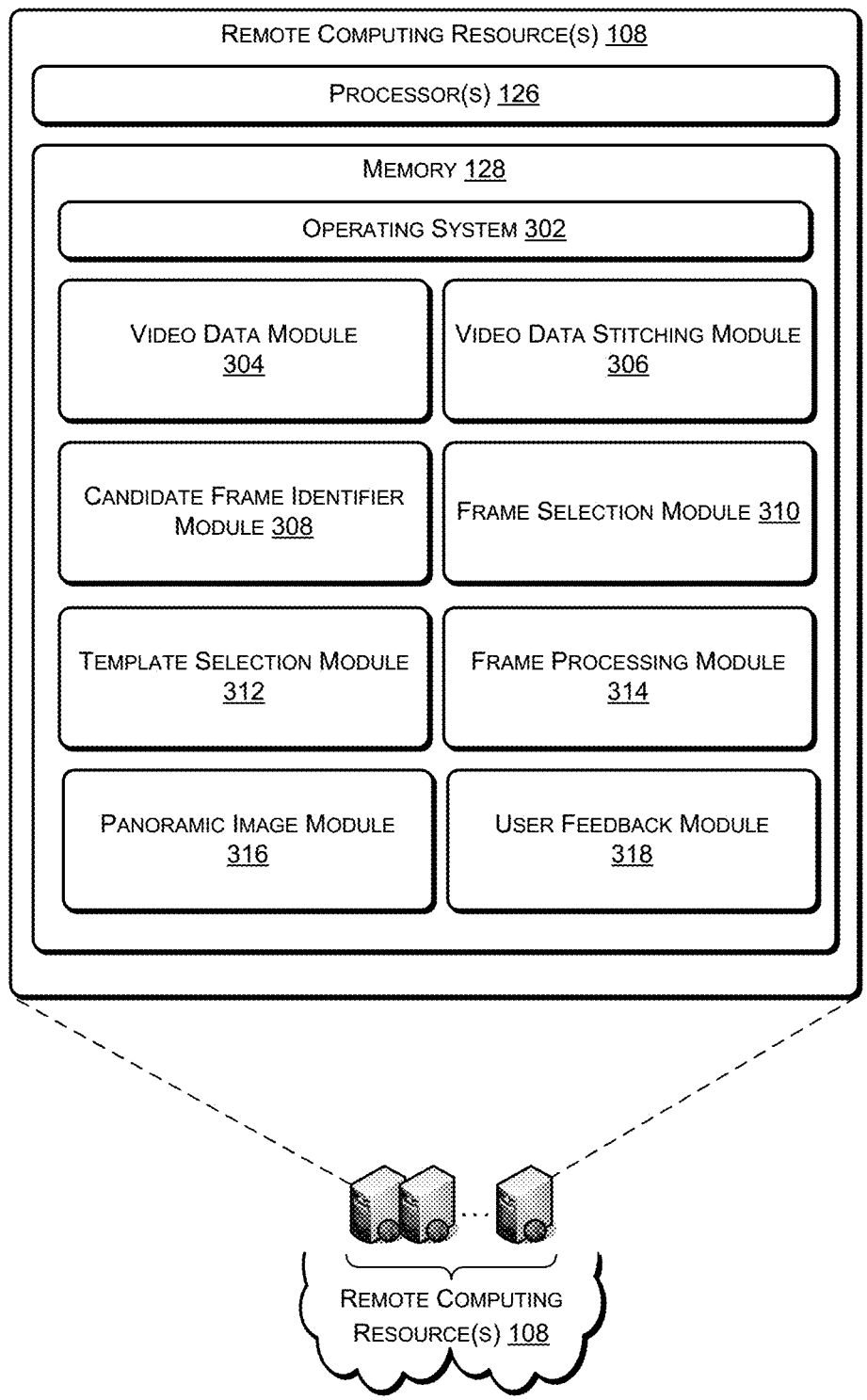
FIG. 3 illustrates an example device that is configured to generate panoramic images based on video data captured by multiple cameras and using one or more algorithms.

FIG. 3 shows selected functional components and/or modules of one implementation of the remote computing resources 108 in additional detail. As shown, the remote computing resources 108 may include the processor(s) 126 and memory 128, which may include an operating system 302, a video data module 304, a video data stitching module 306, a candidate frame identifier module 308, a frame selection module 310, a template selection module 312, a frame processing module 314, a panoramic image module 316, and a user feedback module 318. Moreover, the remote computing resources 108 may generate a panoramic image 132 from video data 120 captured by multiple cameras 114 of the video capture device 102.

In certain embodiments, the video data module 304 may receive video data 120 captured by the multiple cameras 114 of the video capture device 102. The video data module 304 may receive each of the raw video streams captured by each camera 114. In this scenario, the multiple cameras 114 of the video capture device 102 may capture frames of video, encode the frames of video, and then send, via the network 112, the encoded frames of video to the remote computing resources 108. Alternatively, the video data module 304 may receive the stitched video data 124 from the video capture device 102. That is, at least a portion of the stitching of the video data 120 may be performed by the video capture device 102.

Provided that video capture device 102 provided the video streams to the remote computing resources 108, or only stitched a portion of the video streams, the video data stitching module 306 of the remote computing resources 108 may stitch together the video data 120 captured by the multiple cameras 114 of the video capture device 102 using the techniques described herein. For instance, the video data stitching module 306 may decode the encoded video streams transmitted by the video capture device 102 and stitch the frames together, thereby generating the stitched video data 124, which may represent 360° video. The remote computing resources 108 may then perform additional processing on the stitched video data 124.

In certain embodiments, the candidate frame identifier module 308 may identify one or more frames of the stitched video data 124 that depict content that is likely to be of interest to the user 104, and therefore could serve as a candidate for a panoramic image 132 to be provided to the user 104. To do so, the candidate frame identifier module 308 may identify one or more candidate frames of the stitched video data 124 that may be deemed of interest to the user 104 using one or more algorithms and/or classifiers. The remote computing resources 108 may be able to determine which portions of the stitched video data 124 are likely to be of interest to the user 104 based at least partly on specific persons, objects, scenes, etc., that are depicted within those portions. The remote computing resources 108 may also be able to determine which frames of the stitched video data 124 are of better quality, do not contain blurriness, have good color/contrast balance, and so on. Such frames may serve as good candidates to use in order to extract a panoramic image 132.

The candidate frame identifier module 308 may utilize one or more algorithms (e.g., audio-based algorithms, computer vision algorithms, etc.) to determine frames in the stitched video data 124 that have a requisite degree of interest. For the purposes of this discussion, such algorithms may be referred to as a first set of algorithms. Using these algorithms, the candidate frame identifier module 308 may assign varying interest levels (e.g., varying numerical values) to regions of interest (i.e., frames) in the stitched video data 124. Frames within the stitched video data 124 having a higher interest level/value may be those frames that include people, frames that depict individuals smiling towards the location in which the video was captured, frames that depict various scenes (e.g., a room of a house, a beach, mountains, etc.), and so on. The algorithms may be applied to the stitched video data 124 (e.g., the stitched video data 124 may be considered an input for the algorithms) and the output of the algorithms may indicate an interest level/value of different frames of the stitched video data 124. That is, the algorithms may output weights for the frames, where the weights may correspond to a likelihood that the frame is to be of interest to the user 104, as compared to other frames of the stitched video data 124.

The algorithms may include one or more object detection, recognition, and/or identification algorithms that may detect, recognize, and/or identify objects depicted within various frames of the stitched video data 124. Such objects may include people, a building, a landmark, and so on. Object detection algorithms may identify certain objects that are known to be of interest to, or at least are likely to be of interest to, the user 104. The algorithms may also include human detection algorithms that determine whether a person is depicted within a particular frame. Human detection algorithms may determine whether friends, family members, co-workers, etc., are depicted within frames of the stitched video data 124. Face detection algorithms may be configured to detect faces depicted within frames, and may also be able to determine whether the faces are directed towards the camera 114, to determine whether the eyes of individuals are open/closed, and to identify the identity of the person. In addition, smile detection algorithms may be able to determine whether individuals depicted within frames of the stitched video data 124 are in fact smiling, and whether those individuals are smiling towards the camera 114 that captured the video/image. Since it is likely that the user 104 would like an image of friends, family members, etc., that are smiling in the direction of the camera 114, the remote computing resources 108 may identify frames of the stitched video data 124 that depict such content.

The algorithms may also include one or more scene detection algorithms that are configured to detect a scene or landscape depicted within frames of the stitched video data 124. For instance, the scene detection algorithms may determine whether frames of the stitched video data 124 depict a home setting, a beach setting, a mountain setting, a city setting, a lake setting, and so on. The scene detection algorithms may identify individual pixels in the frames and classify the pixels differently, such as by classifying some pixels as sky, others as water, others as beach, others as grass, and so on. By identifying different scenes depicted within the frames, the candidate frame identifier module 308 may identify settings or scenes that are likely to be of interest to the user 104 (e.g., the beach, a mountain range, etc.), while identifying other settings or scenes that likely would not be of interest to the user 104 (e.g., an unaesthetically pleasing building). In addition, the algorithms may include background detection algorithms that detect/determine the background (e.g., sky, water, mountains, etc.) depicted within a particular frame. Accordingly, the remote computing resources 108 may identify picturesque scenes that would serve as good candidates for a panoramic image 132.

The algorithms may also determine the quality of the frames of the stitched video data 124. For instance, one or more visual saliency algorithms may determine the contrast associated with frames. For instance, the visual saliency algorithms may identify objects that have a high degree of contrast as compared to other objects depicted in the frame (e.g., a pink flamingo standing on green grass). Other image quality algorithms may determine she sharpness of the frames, such as by determining whether any blur exists within the frames, as well as determining the color and saturation associated with the frames. Any distortions or other defects associated with the frames may also be detected, such as frames, or the horizon depicted within the frames, being uneven or crooked.

In additional embodiments, the algorithms may include motion detection algorithms to determine whether any objects are moving within the frames of the stitched video data 124. The user 104 may be interested in images depicting a person running or otherwise moving. The algorithms may also include pose and/or gesture detection algorithms that detect various poses of individuals depicted within the frames, or that detect gestures performed by the individuals. Such poses/gestures may include an individual jumping, waving, giving a "thumbs up," making a "peace sign," and so on. A determination that frames include individuals looking towards the camera 114 and performing some action may increase user interest in such frames.

As stated above, the candidate frame identifier module 308 may assign interest levels or values to different frames of the stitched video data 124, where the interest levels/values are based on the objects, individuals, scenes, etc., depicted within the frames. The objects/features/content depicted within the frames may contribute to the interest levels/values that are attributed to those frames. For instance, detection/identification of a face depicted in a frame may correspond to a first value representing a first level of interest, a level horizon of a frame may correspond to a second value representing a second level of interest, detection of a particular scene depicted in a frame may correspond to a third value that represents a third level of interest, and so on. In addition, the interest levels/values of the frames of the stitched video data 124 may be illustrated as a curve that includes a data point for each frame of the stitched video data 124. Using the curve, the candidate frame identifier module 308 may determine which frames are the best candidates for generating a panoramic image 132 for the user 104.

In various embodiments, the frame selection module 310 may select a frame of the candidate frames identified by the candidate frame identifier module 308. The selected frame may serve as a frame that is to be used to generate the panoramic image 132 that is to be sent to the user 104. The frame that is selected by the frame selection module 310 may be the frame within the stitched video data 124 that has the highest interest level/value, or that has a relatively high interest level/value, which may indicate that the selected frame depicts content that is most likely to be of interest to the user 104, and may depict content that is suitable to be depicted in the panoramic image 132. In other embodiments, provided that a first frame is associated with a first interest level/value that is greater than a second interest level/value associated with a second frame, the frame selection module 310 may select the first frame over the second frame. Moreover, the frame selection module 310 may select one or more frames that have corresponding interest levels/values that are above a threshold value.

Provided that the candidate frame identifier module 308 generates a curve that indicates the interest level/scores for the frames of the stitched video data 124, the frame selection module 310 may identify one or more local maxima associated with the curve. For the purposes of this discussion, local maxima may be referred to greater values associated with the curve that are within a given neighborhood or range, which may correspond to the data points representing frames of the stitched video data 124. The local maxima residing on the generated curve, which may be shown as a peak or rise on the curve, may indicate data points representing frames of the stitched video data 124 having a greater interest level/value. Local maxima illustrated on the curve may indicate frames of the stitched video data 124 that are promising candidates in which the panoramic image 132 may be generated from.

Moreover, upon the frame selection module 308 selecting one or more frames, the frame selection module 308 may consider frames that are temporally proximate to the selected frame. That is, one or more frames that are proximate in time or space to the selected frame may be considered to determine if such frames are more appropriate for the purpose of generating the panoramic image 132. The proximate frames may be prior to or subsequent in time to the selected frame, as determined by the time stamps associated with the frames, and thereby may capture the same or similar content. The proximate frames may also depict content from a field of view different from that of the selected frame.

The frame selection module 310 may further analyze the selected frame to ensure that it is appropriate for generating a panoramic image 132 therefrom. For instance, the frame selection module 310 may eliminate candidate frames that depict an uneven horizon, or that include blurriness, distortions, or other defects that are aesthetically unappealing.

In certain embodiments, the remote computing resources 108 may determine or classify the composition or content of the selected frame. That is, the remote computing resources 108 may determine the type of scene that is depicted within the selected frame, where the type of scene may include a beach scene with water and sand, a home setting, a landscape scene having mountains and trees, an action scene, and so on. Metadata associated with the frame may also indicate the type of content depicted within the selected frame. Based on the composition of the scene, the template selection module 312 may identify a template that is appropriate to apply to the selected frame. For instance, for an action scene having moving objects, an action template may be selected and applied to the selected frame, whereas a landscape template, a beach template, or an indoors template may be used for frames having different compositions.

Upon selecting the frame to be used to generate the panoramic image 132, the frame processing module 314 may process the selected frame to determine the content that is to be depicted in the panoramic image 132. The frame processing module 314 may apply one or more algorithms (i.e., a second set of algorithms) to generate the panoramic image 132 that is to be provided to the user 104. That is, the frame processing module 314 may determine an extent of the selected frame to be included in the panoramic image 132.

The frame processing module 314 may determine, possibly using one or more endpoint/edge detection algorithms, locations within the selected frame (e.g., a first location and a second location) that will serve as endpoints for the panoramic image 132. The endpoints may correspond to cutoff points that will serve as the sides of the panoramic image 132. To determine the endpoints of the panoramic image 132, the frame processing module 314 may apply or execute one or more algorithms with respect to the selected frame. For instance, the frame processing module 314 may apply human detection algorithms to determine if individuals are depicted within the selected frame. If a single person is depicted within the selected frame, the frame processing module 314 may select the endpoints such that the individual is depicted between the two endpoints, but is positioned near the center of the panoramic image 132, or is positioned to either side of the panoramic image 132 in closer proximity to one of the endpoints. However, if multiple individuals are depicted within the selected frame, such as the multiple individuals being grouped together, the endpoints may be selected such that the group of individuals is positioned towards the center of the panoramic image 132.

The frame processing module 314 may also select the endpoints based on which individuals are to be depicted within the panoramic image 132. For instance, the frame processing module 314 may execute face detection algorithms that are configured to detect faces depicted within the selected frame, determine whether the faces are directed towards the camera 114 that captured the video, and/or identify the individual associated with the detected face. That way, the frame processing module 314 may select the endpoints to include or exclude certain individuals from being depicted within the panoramic image 132. For instance, the endpoints can be selected to include friends or family of the user 104, or other individuals that are facing the camera 114. On the other hand, individuals that are not facing the camera 114 (e.g., individuals turned to the side or individuals with their back to the camera 114) were likely not intended to be captured within the video stream captured by that particular camera 114. Smile detection algorithms may also be applied to determine whether individuals are smiling towards the camera 114, which may indicate that such individuals were intended to be captured. The endpoints may be selected such that smiling faces are depicted in the panoramic image 132. Gesture and/or pose detection algorithms may also be applied to detect gestures/poses of the individuals depicted within the selected frame. The endpoints may be selected to include individuals that are performing certain gestures (e.g., waving, a "thumbs up," etc.). In addition, the endpoints can be selected to depict content that complies with the Rule of Thirds for photographic composition, which may be performed using one or more auto-composition algorithms.

In addition, the frame processing module 314 may select locations within the selected frame to serve as the endpoints to avoid having only a portion of an individual being depicted within the panoramic image 132. That is, the frame processing module 314 may avoid placing the endpoints such that a portion of an individual is depicted within the panoramic image 132, while the other portion of the individual is not depicted within the panoramic image 132. In additional embodiments, the user 104 may manually select the endpoints that will serve as the edges of the panoramic image 132. For instance, provided that the user 104 has identified content that he/she considers to be aesthetically pleasing, the user 104 may select endpoints within the selected frame and/or vary previously determined endpoints. Upon the user 104 selecting or modifying the endpoints, the content depicted within the endpoints may serve as the panoramic image 132. The user 104 may select/vary the endpoints via the video capture device 102 and/or the user device 106.

In some embodiments, the selected frame that is used to generate the panoramic image 132 may not depict any individuals, and may instead depict a landscape (e.g., a beach, a lake, mountains, etc.). The frame processing module 314 may utilize one or more scene detection and/or background detection algorithms to determine which objects, background, and/or scene is to be included in the panoramic image 132. The frame processing module 314 may then select the endpoints for the panoramic image 132 based on this determination. For instance, the endpoints may be selected such that the panoramic image 132 will depict certain aesthetically pleasing features (e.g., a beach, mountains, a city landscape), while exclude aesthetically displeasing features, such as power lines, a vehicle, a rundown section of a city, and so on.

As stated above, the frame processing module 314 may identify two different endpoints in the selected frame for the purpose of generating the panoramic image 132. Prior to selecting the endpoints, the frame processing module 314 may determine or assign a pixel address to the pixels included within the selected frame. Generally, each pixel/pixel value within each frame of the stitched video data 124 may have a particular pixel address. More particularly, each pixel/pixel value associated with the selected frame may be assigned a corresponding pixel address. For instance, each pixel within the selected frame may have a specific pixel address (e.g., "x, y") that is based on a coordinate system associated with the selected frame. That is, the pixel address for a particular pixel/pixel value may be based on an x-axis and a y-axis (and possibly a z-axis) associated with the selected frame. The pixel addresses associated with or assigned to the pixels may then be used to define the endpoints of the selected frame, where the endpoints will serve as the edges of the panoramic image 132. For example, if it was determined that a particular individual depicted within the selected frame is to be included within the panoramic image 132, the frame processing module 314 may selected the endpoints based on pixel addresses that are on opposite sides of the individual.

As an illustrative example, the stitched video data 124 may include any number of frames based on a particular frame rate (e.g., 30 frames/minute). Each frame of the stitched video data 124 may be associated with video data 120 of a certain duration (e.g., 0.5 seconds). As a result, each frame may have a start time (or a first time) and an end time (or a second time). The endpoints determined for the selected frame may correspond to pixel addresses/coordinates included within the selected frame, which may depict content captured by at least one of the cameras 114 of the video capture device 102 between the start time and the end time for that selected frame.

In some instances, the video capture device 102 may be uneven (e.g., tilted at an angle) when the multiple cameras 114 capture the video data 120. As a result, the selected frame may also be uneven or crooked. The frame processing module 314 may apply or execute one or more algorithms (e.g., horizon leveling algorithms) that are configured to detect the horizon associated with the content depicted in the selected frame, and rotate the panoramic image 132 so that the horizon is flat/even. Rotation of the image may be performed after the endpoints/boundaries have been selected. Accordingly, even if the video capture device 102 was crooked when the video data 120 was captured, thereby resulting in unlevel frames of the stitched video data 124, the remote computing resources 108 may nonetheless generate a relatively level panoramic image 132.

The horizon depicted within the selected frame may be determined by one or more horizon detection algorithms that identify first pixels from the selected frame that represent a sky, or that at least represent content within the scene depicted in the selected frame that is not the ground. The horizon detection algorithms may also identify second pixels that are representative of the ground of the scene. To determine the horizon within the selected frame, the horizon detection algorithms may determine a border between the first pixels and the second pixels. That is, the horizon may correspond to pixels within the first pixels that are adjacent to pixels within the second pixels. Therefore, border may represent points where a sky region depicted in the selected frame meets, or is adjacent to, a ground region depicted in the selected frame.

In some embodiments, the stitched video data 124 may appear to be wavy or uneven due to the movement of the cameras 114 while recording video as the video capture device 102 moves or rotates on one or more of its axes. For instance, each of the cameras 114 may move a different direction as the video capture device 102, or a just portion of the video capture device 102, moves upwards, downwards, to the side, and/or rotates. The horizon detection algorithm(s) may be utilized to detect the waviness of the selected frame and to rotate the selected frame in the appropriate direction. Provided that the selected frame is not aligned with the horizon depicted within the frame, thereby possibly resulting in an image that is at least partially crooked, the image processing module 314 may rotate or warp the image.

The alignment of the frames captured by the cameras 114 may also be leveled prior to stitching the video streams together. For instance, the remote computing resources 108 may use data obtained from one or more of the sensors 210 of the video capture device 102. Such data may include the orientation, tilt, rotation, movement, etc., of the video-capture device 102 as the cameras 114 were capturing the video data 120. The sensed data may indicate an extent to which the video capture device 102 was crooked (not level) at that time, and the frames of the video data 120 may be rotated to compensate for the tilt of the video capture device 102. That is, before the video streams are stitched together, the frames can be rotated and blended such that the stitched video data 124 appears to be seamless, or relatively seamless. In other embodiments, provided that the video streams have already been stitched together, the frame processing module 314 may partition the frames of the stitched video data 124, align the frames with their corresponding adjacent frames, and stitch the frames together again. Furthermore, the frame processing module 314 may apply or run one or more algorithms that perform additional processing to enhance the quality or aesthetics of the selected frame, such as by performing blending, increasing/decreasing contrast, adjusting color, applying a filter, adding a caption, removing/reducing distortions and/or blur, and so on.

Since the stitched video data 124 is generated from video data 120 captured from multiple cameras 114 of the video capture device 102, the selected frame may depict content that was captured by two different cameras 114. For instance, provided that the selected frame depicts an individual or object that was included in both a first field of view 226 of a first camera 114 and a second field of view 226 of a second camera 114 at the time the selected frame was captured, the resulting panoramic image 132 may be generated from video simultaneously captured by two different cameras 114 with overlapping fields of view 226.

Moreover, the selected frame that will serve as the panoramic image 132 may be based on frames prior and subsequent to the selected frame, where the other frames may be identified based on time stamps associated with each of the frames. As a result, the remote computing resources 108 may track objects over time as the objects are depicted in frames having different time stamps. As a result, the remote computing resources 108 may initially detect/identify an object/individual depicted in a first frame having a first time stamp, and then subsequently detect/identify the object/individual depicted in a second frame having a second time stamp that is subsequent in time to the first time stamp.

Moreover, in other embodiments, the frame processing module 314 may use frames having prior or subsequent time stamps, as compared to the time stamp of the selected frame, to modify the selected frame. For example, assume that the selected frame depicts a beach scene having a beach and the ocean. Further assume that the selected frame depicts an undesired object, such as a seagull flying across the scene, or that the selected frame depicts individuals that are not smiling. In these scenarios, the frame processing module 314 may leverage frames prior to and/or subsequent to the selected frame to modify the selected frame. That is, the frame processing module 314 may use a different frame where the seagull is not present to cause the seagull to not be depicted within the selected frame, or may identify frames in which the individual is smiling, and thereby cause the selected frame to depict the individual smiling.

As a result, the frame processing module 314 may modify objects depicted within the selected frame, add objects to the selected frame that are not currently depicted, and/or remove objects currently depicted in the selected frame. To do so, the frame processing module 314 may use one or more filling algorithms, which may fill an occluded portion of the selected frame using content from the selected frame and/or content from one or more other frames of the stitched video data 124. In addition, the frame processing module 314 may use motion detection algorithms to determine that an object depicted in the selected frame is moving, and modify the selected frame as a result. For instance, provided that an individual depicted in the selected frame is running, the frame processing module 314 may cause multiple instances of the individual to be depicted in the selected frame, such that it may appear that the individual is running across the scene depicted in the selected frame.

Accordingly, once the frame is selected, the frame processing module 314 may apply, execute, or run a second set of algorithms with respect to the selected frame, where the second set of algorithms may be more or less computationally expensive and/or intensive as compared to the first set of algorithms. In addition to the algorithms set forth above, the frame processing module 314 may apply one or more seam carving algorithms. For the purpose of this discussion, seam carving algorithms may correspond to image resizing, which may correspond to establishing a number of seams (i.e., paths of least importance) in an image (e.g., the selected frame) and removing (automatically or otherwise) seams to reduce image size or insert seams to extend the image size. Seam carving algorithms may also allow manually defining areas in which pixels associated with the selected frame may not be modified, as well as the ability to remove one or more objects from the selected frame. The frame processing module 314 may also apply one or more iterative shrinkage/thresholding (IST) algorithms with respect to the selected frame. Furthermore, the frame processing module 314 may perform zoom operations with respect to the selected frame such that content depicted in the selected frame may appear closer or farther.

Therefore, the frame processing module 314 and/or the panoramic image module 316 may process and/or modify the selected frame to generate a panoramic image 132. The panoramic image 132 may then be provided to the user 104 associated with the video capture device 104, or any other individual. For instance, the panoramic image 132 may be sent to a user device 106 associated with the user 104 via a website, an e-mail message, a text message, or in any other manner. In some embodiments, the panoramic image 132 may be displayable via a display associated with the video capture device 102. Moreover, the user 104 may be provided with multiple different panoramic images 132, such as multiple different panoramic images 132 depicting the same or a similar scene, or multiple different panoramic images 132 depicting different scenes. The user 104 may elect to choose one or more of the multiple panoramic images 132. As set forth above, the panoramic image(s) 132 may depict individuals, objects, scenes, etc., captured by one or more of the multiple cameras 114 of the video capture device 102. The panoramic image(s) 132 generated by the remote computing resources 108 may also be based on the user 104 himself/herself, such as information known or inferred about the user 104, interests of the user 104, and/or preferences of the user 104, whether provided by the user 104, or otherwise.

In additional embodiments, the user feedback module 318 may provide a mechanism for the user 104 to provide feedback relating to the previously provided panoramic image(s) 132, such as providing ratings, reviews, etc. The feedback may be favorable, indicating that the user 104 liked one or more of the panoramic images 132. In other embodiments, the feedback may not be favorable, such as the user 104 indicating that he/she does not like the panoramic image(s) 132 (including reasons why), that the user 104 would like one or more additional panoramic images 132, or that the user 104 requests that the panoramic image(s) 132 be modified in some manner. The remote computing resources 108 may provide additional panoramic images 132 and/or modify the previously provided panoramic image(s) 132 as a result. In addition, the user feedback module 318 may use the feedback to modify the one or more algorithms used to generate the panoramic image(s) 132. For instance, the user feedback module 318 may modify the variables, weights, etc., of the algorithms for the purpose of subsequently generating panoramic images 132 that are more likely to be of interest to the user 104.

Accordingly, the remote computing resources 108 may generate a panoramic image 132 of any individuals, objects, scenes, etc., included in video captured by any one of the cameras 114 of the video capture device 102. For instance, a group of individuals could stand and smile in the direction of the video capture device 102 momentarily, without having to perform any action provided that the cameras 114 of the video capture device 102 are currently recording video. The video capture device 102 and the remote computing resources 108 may then generate a panoramic image 132 of the scene, which may depict the group of individuals. In addition, an individual could carry the video capture device 102 (e.g., in his/her hand, via an attachment or mounting) while performing some activity (e g, hiking, driving, surfing, parasailing, etc.), and the remote computing resources 108 may generate panoramic images 132 that depict the activity being performed by the user 104, which is likely to be of interest to that individual.

FIGS. 4, 5, 7, and 8 are flow diagrams of illustrative processes for generating one or more panoramic images based on video data captured by multiple cameras of a video capture device. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
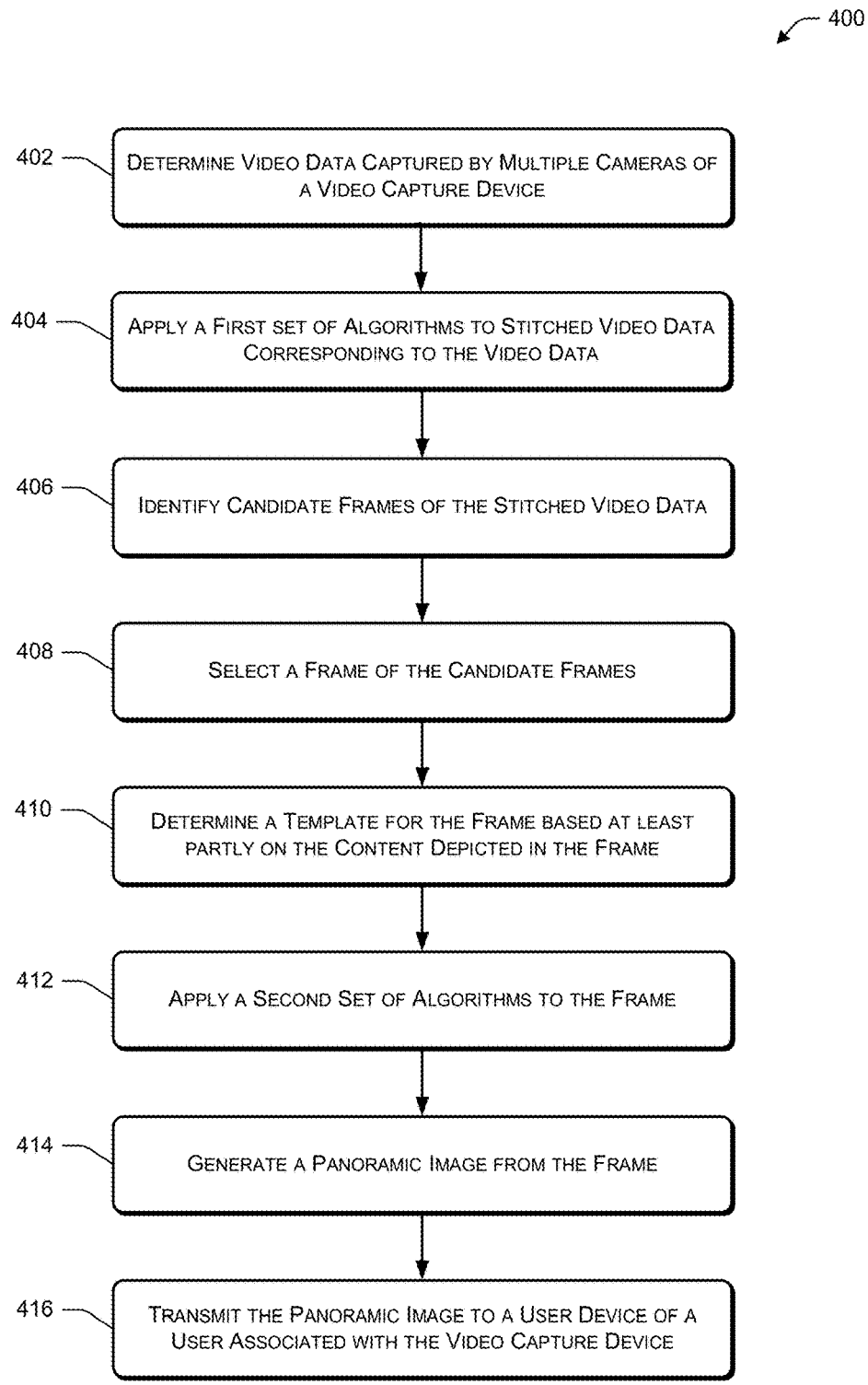
FIG. 4 is a flow diagram illustrating an example process of generating a panoramic image based on video data captured by multiple cameras of a device.

FIG. 4 is a flow diagram illustrating an example process 400 of generating a panoramic image based at least partly on one or more algorithms and video data captured by multiple cameras of a video capture device. Moreover, the following actions described with respect to FIG. 4 may be performed by the video capture device 102 and/or the remote computing resource(s) 108, as illustrated in, and described with respect to, FIGS. 1-3.

Block 402 illustrates determining video data captured by multiple cameras of a video capture device. In various embodiments, multiple cameras 114 of the video capture device 102 may each capture a video stream within a corresponding field of view 226. For instance, four different cameras 114 that are positioned approximately 90° from one another may simultaneously capture video data 120. In some embodiments, the video capture device 102 may transmit the raw video streams to the remote computing resources 108 for stitching. In other embodiments, the video capture device 102 may include one or more modules 122 that apply/run/execute video stitching algorithms to stitch together the video streams, thereby creating a 360° video (i.e., the stitched video data 124). The stitched video data 124 may then be sent to the remote computing resources 108.

Block 404 illustrates applying a first set of algorithms to stitched video data corresponding to the video data. Regardless of whether the video data 120 is stitched by the video capture device 102 and/or the remote computing resources 108, the remote computing resources may run one or more algorithms with respect to the stitched video data 124 in order to identify frames of the stitched video data 124 that are likely to be of interest to a user 104 associated with the video capture device 102 and possibly other individuals.

Block 406 illustrates identifying candidate frames of the stitched video data. Utilizing the first set of algorithms, the remote computing resources 108 may identify frames of the stitched video data 124 that depict individuals, various objects, certain scenes, and so on, that are likely to be of interest to the user 104. For instance, the candidate frames may include any number of frames that depict content at different times, such as a first frame that depicts first content (e.g., a first scene, a first person, a first object, a first event, etc.) at a first time and a second frame that depicts second content at a time subsequent to the first time (e.g., a second scene, a second person, a second object, a second event, etc.). That is, the first frame and the second frame may include representations of different scenes, persons, events, etc., at the same time or at different times. In addition, the remote computing resources 108 may identify frames that are of good quality (e.g., color, contrast, no blurriness, etc.) and/or frames that depict individuals that are facing the camera, individuals that are smiling, individuals performing various gestures (e.g., waving, giving a "thumbs up" sign, etc.). As a result, the candidate frames may serve as possible candidates that may be used to generate a panoramic image 132.

Block 408 illustrates selecting a frame of the candidate frames. In certain embodiments, the remote computing resources 108 may determine and/or assign interest levels/values to frames of the stitched video data 124. Frames having the highest, or relatively higher, interest levels/ values, or frames having interest levels/values above a threshold value, may be selected to be used to generate the panoramic image 132.

Block 410 illustrates determining a template for the frame based at least partly on the content depicted in the frame. In certain embodiments, the remote computing resources 108 may determine the content or composition depicted within the selected frame, such as whether the selected frame depicts an indoors scene, a beach scene, a city landscape, and so on. The remote computing resources may apply an appropriate template to the selected frame based on the content/composition of the selected frame.

Block 412 illustrates applying a second set of algorithms to the frame. Upon selecting the frame, the remote computing resources 108 may apply additional algorithms with respect to the selected frame. For instance, the remote computing resources 108 may run edge detection algorithms to determine locations within the selected frame that will serve as the endpoints and/or edges/sides of the panoramic image 132. The endpoints may be determined based on whether certain individuals, objects, landmarks, etc., are to be depicted within the panoramic image 132. The remote computing resources 108 may also run horizon leveling algorithms that determine a horizon of the selected frame and to level the selected frame if the horizon is determined to be uneven or wavy.

Block 414 illustrates generating a panoramic image from the frame. Based at least partly on determining the endpoints of the selected frame, and performing other algorithms that modify or enhance the selected frame, the remote computing resources 108 may thereby generate the panoramic image 132. The panoramic image 132 may depict content that was included in different fields of view 226 of different cameras 114 and were therefore captured by different cameras 114. Moreover, the panoramic image 132 may represent an image that is likely to be of interest of the user 104, such as the panoramic image 132 including friends/family of the user 104, individuals that are looking towards and/or smiling towards the video capture device 102 when the video was captured, a good quality image (e.g., color, contrast, etc.), and aesthetically pleasing scenes (e.g., a beach, a sunset, a mountain range, etc.).

Block 416 illustrates transmitting the panoramic image to a user device of a user associated with the video capture device. Upon generating one or more panoramic images 132, the remote computing resources may provide the panoramic image(s) 132 to a user device 106 associated with the user 104 in any manner (e.g., a website, an e-mail message, etc.).

Figure 5:
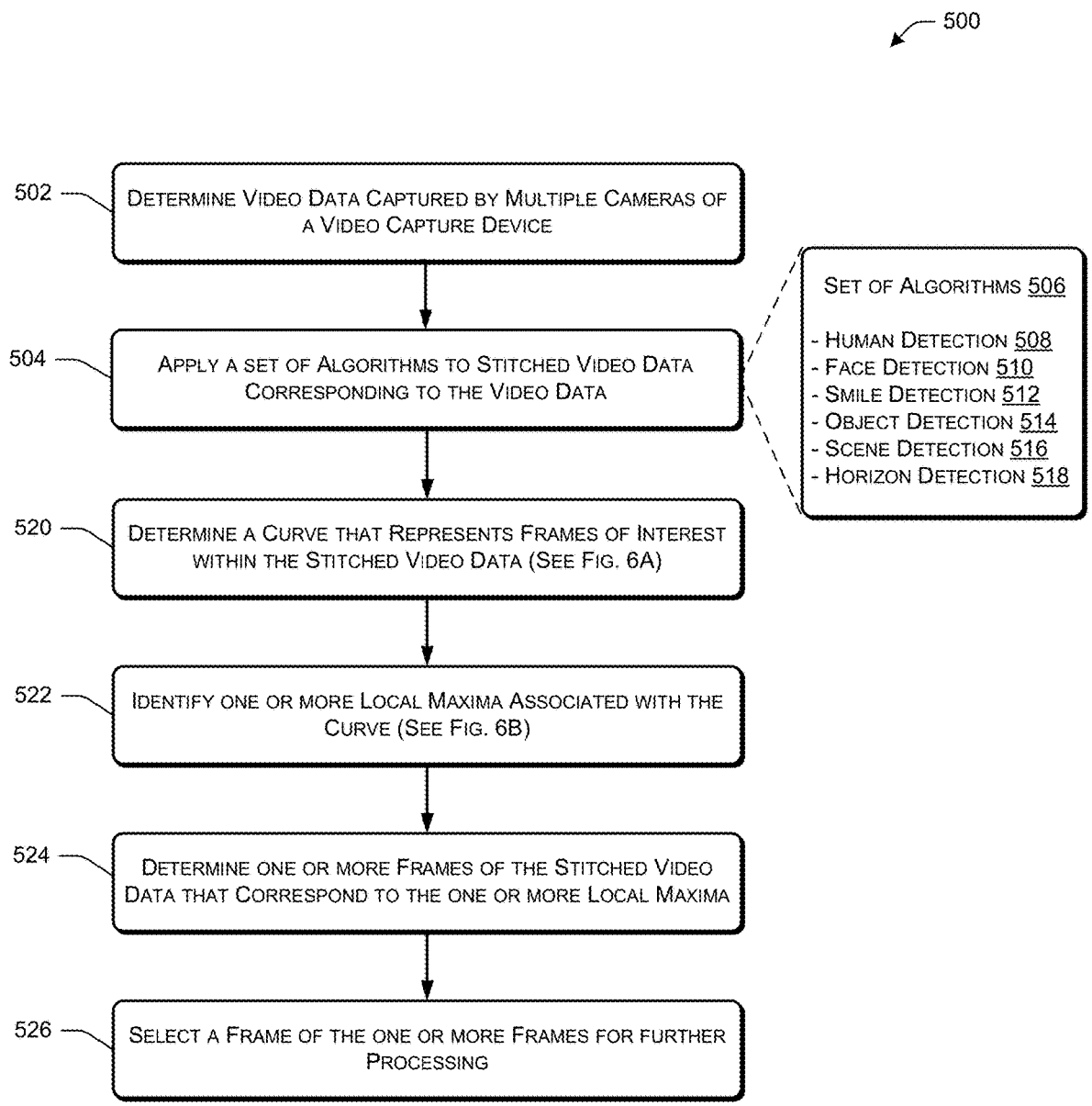
FIG. 5 is a flow diagram illustrating an example process of selecting a frame of stitched video data that is to be used to generate a panoramic image.

FIG. 5 is a flow diagram illustrating an example process 500 of identifying frames of stitched video data that depict features that are likely to be of interest to a user. Moreover, the following actions described with respect to FIG. 5 may be performed by the video capture device 102 and/or the remote computing resource(s) 108, as illustrated in, and described with respect to, FIGS. 1-3.

Block 502 illustrates determining video data captured by multiple cameras of a video capture device. As set forth above, multiple cameras 114 of the video capture device 102 may simultaneously capture video data 120 of an environment surrounding the video capture device 102.

Block 504 illustrates applying a set of algorithms to stitched video data corresponding to the video data. After the video capture device 102 and/or the remote computing resources 108 stitch the video data 120 together, the remote computing resources 108 may run one or more algorithms with respect to frames of the stitched video data 124. For instance, as a non-limiting example, the set of algorithms 506 may include a human detection 508 algorithm that detects the presence of people within the frames of the stitched video data 124, face detection 510 algorithms that detect and/or identify faces of individuals, smile detection 512 algorithms that determine whether individuals are smiling, object detection 514 algorithms that detect and/or identify objects depicted in the frames of stitched video data, scene detection 516 algorithms that determine the type of scene (e.g., indoors, a beach, etc.), and/or horizon detection 518 algorithms that determine a horizon within the frames of the stitched video data 124. The first set of algorithms may be executed with respect to the stitched video data 124 to identify frames that depict content that is likely to be of interest to a user 104.

Block 520 illustrates determining a curve that represents frames of interests within the stitched video data. Based on the content depicted within the frames of the stitched video data 124, the remote computing resources 108 may generate a curve that includes data points that correspond to frames of the stitched video data 124. Each data point may represent an interest level/value that corresponds to a likelihood that the user 104 would be interested in a panoramic image 132 that includes individuals, objects, scenes, etc., that are depicted within the frames. The curve described with respect to block 520 is further illustrated in FIG. 6A.

Block 522 illustrates identifying one or more local maxima associated with the curve. The local maxima associated with the curve may represent frames of the stitched video data 124 that are most likely to be of interest to the user 104. For instance, frames corresponding to the local maxima may include individuals, objects, scenes, etc., that would make for an aesthetically pleasing panoramic image 132. The curve may include a single local maxima or multiple local maxima that may be used to generate panoramic images 132. Identifying local maxima associated with the curve is further illustrated in FIG. 6B.

Block 524 illustrates determining one or more frames of the stitched video data that correspond to the one or more local maxima. That is, by identifying the local maxima on the curve, the remote computing resources 108 may be identifying one or more frames of the stitched video data 124 that may be used to generate one or more panoramic images 132.

Block 526 illustrates selecting a frame of the one or more frames for further processing. Moreover, one or more of the frames may be selected to be used to generate panoramic images 132 to be sent to the user 104. The selected frame(s) may be further processed by the remote computing resources 108 in order to generate a panoramic image 132.

Figure 6A:
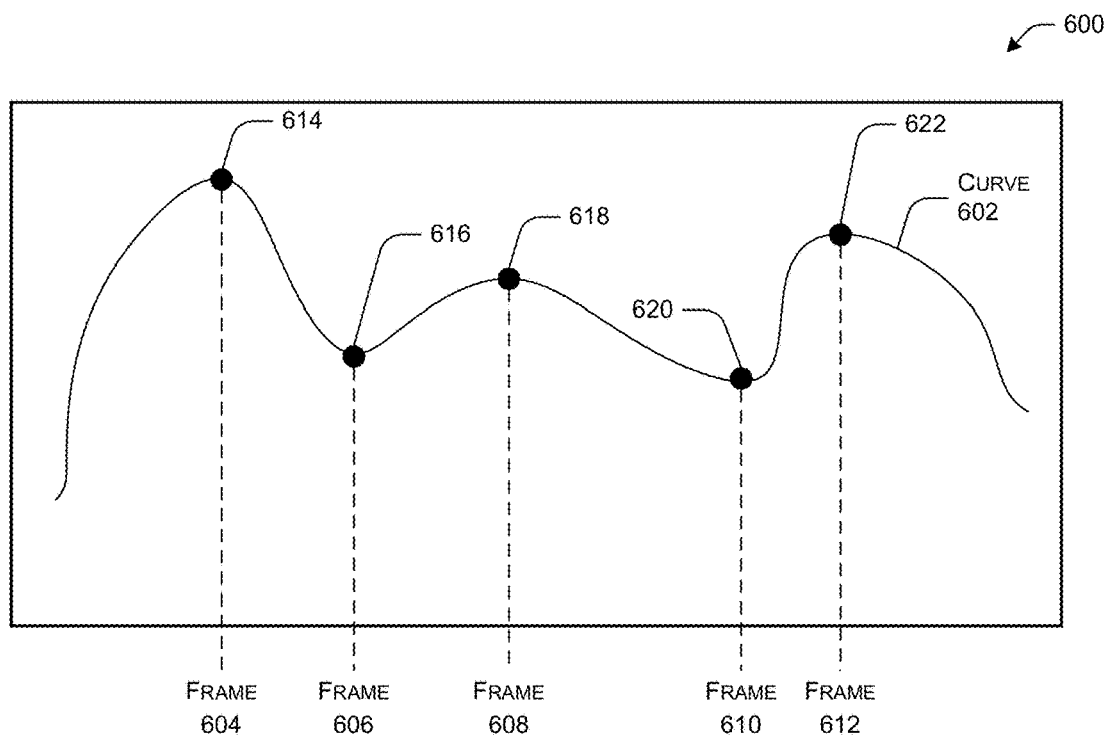
FIG. 6A is an example diagram for determining a curve based on interest values associated with multiple candidate frames of video data.

FIG. 6A is a diagram illustrating a curve that is generated to indicate frames of interest within stitched video data. As shown in FIG. 6A, the curve 602 may be representative of multiple frames (e.g., frames 604-612) of the stitched video data 124. Moreover, an interest value may be associated with each of frames 604-612, where each interest value may indicate a likelihood that the user 104 is to be interested in the content depicted within each of the frames. For instance, frames that depict certain individuals, scenes, objects, etc., that the user 104 would likely want depicted within the panoramic image 132 may have relatively higher interest values.

As shown, interest level 614 corresponds to frame 604, interest level 616 corresponds to frame 606, interest level 618 corresponds to frame 608, interest level 620 corresponds to frame 610, and interest level 622 corresponds to frame 612. The interest values 614-622 may be plotted on a graph (or some other medium) based on their relative numerical values, and the curve 602 may be generated based on these relative values. Here, the curve 602 is generated by intersecting, or coming in close proximity to, each of the interest values 612-622 that are representative of the multiple frames 604-612 of the stitched video data 124. Accordingly, the curve 602 may identify candidate frames of the stitched video data 124 that could possibly be selected to be used to generate the panoramic image(s) 132. For the purposes of this discussion, the curve 602 may be of any shape or form, and may be dependent upon the particular interest values associated with the candidate frames.

Figure 6B:
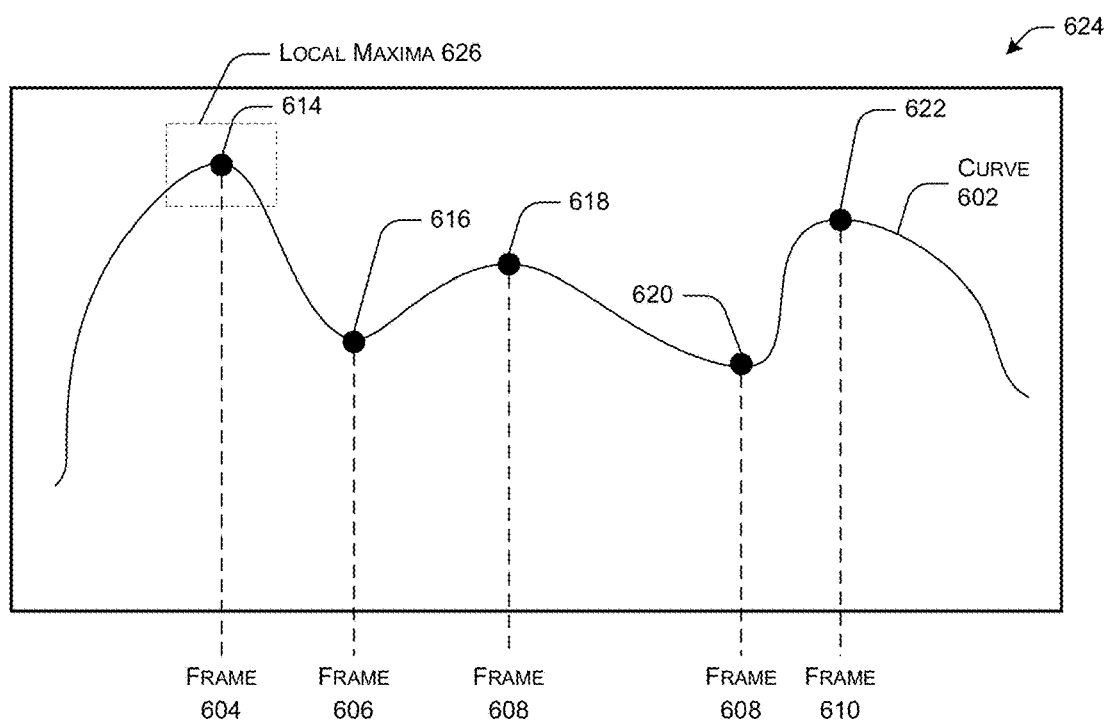
FIG. 6B is an example diagram for selecting a frame of multiple candidate frames of video data from a curve that is determined based on interest values associated with the multiple candidate frames.

FIG. 6B illustrates a diagram 624 that is similar to diagram 600 illustrated in FIG. 6A. As shown in FIG. 6B, the diagram 624 includes the curve 602, the frames 604-612 of the stitched video data 124, and the interest values 614-622 that are representative of, or are associated with, the frames 604-612. In some embodiments, the systems and processes described within may select a frame to serve as a source of the panoramic image 132 based on the curve 602. More particularly, the remote computing resources 108 may identify one or more local maxima associated with the curve 602, where the one or more local maxima correspond to frames having the highest, or higher, interest values. Since a higher interest value associated with a frame may indicate that the frame depicts content (e.g., individuals, objects, scenes, etc.) that is likely to be of interest to the user 104, the remote computing resources 108 may identify the local maxima associated with the curve 102 in order to select a frame from the previously identified candidate frames.

As illustrated in FIG. 6B, the interest value 614 associated with frame 604 is greater than the other interest values 616-622 associated with the other frames 606-612 of the stitched video data 124. This interest value 614 is highlighted using a box with dashed lines. That is, the interest value 614 associated with frame 604 is located at a higher position on the curve 602 than the other interest values 616-622. As a result, this interest value 614 may represent a local maxima 626 associated with the curve 602. The systems and processes described herein may then select the frame 604 corresponding to the interest value 614 to serve as a source to generate the panoramic image 132 for the user 104. In some embodiments, provided that multiple panoramic images 132 are to be generated for the user 104, the remote computing resources 108 may identify multiple local maxima associated with the curve 602. In this scenario, the highest two interest values (i.e., interest value 614 and interest value 622) may each constitute a local maxima 626. Accordingly, the frames associated with those interest values (i.e., frame 604 and frame 610) may be selected to be used to generate panoramic images 132. The selected frames may then be further processed to generate the panoramic images 132.

Figure 7:
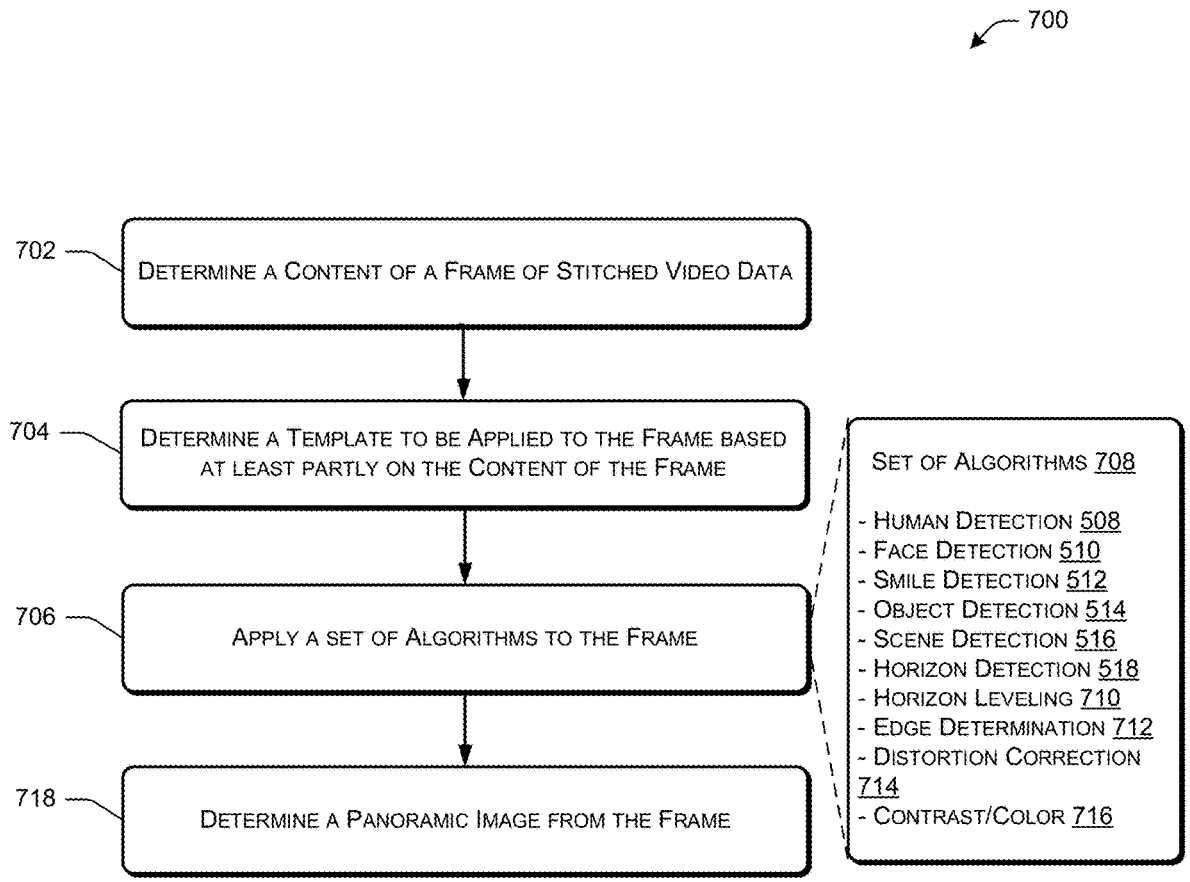
FIG. 7 is a flow diagram illustrating an example process of generating a panoramic image by applying one or more algorithms to a frame of stitched video data.

FIG. 7 is a flow diagram illustrating an example process 700 of generating a panoramic image from a frame of stitched video data. Moreover, the following actions described with respect to FIG. 7 may be performed by the video capture device 102 and/or the remote computing resource(s) 108, as illustrated in, and described with respect to, FIGS. 1-3.

Block 702 illustrates determining content of a frame of stitched video data. As described above with respect to FIG. 5, the process 500 may select a frame that is to be used to generate a panoramic image 132. The remote computing resources 108 may also determine the content and/or composition of the selected frame, such as by determining that the selected frame depicts an indoor scene or an outdoor scene (e.g., a beach scene, a city landscape, etc.).

Block 704 illustrates determining a template to be applied to the frame based at least partly on the content of the frame. Based on the content and/or composition of the selected frame, the remote computing resources 108 may optionally select a template to be applied to the selected frame.

Block 706 illustrates applying a set of algorithms to the frame. That is, the remote computing resources 108 may run or execute algorithms that facilitate the generation of the panoramic image 132. As set forth above, the set of algorithms 708 may include the human detection 508, face detection 510, smile detection 512, object detection 514, scene detection 516, and/or horizon detection 518 algorithms described with respect to FIG. 5. The set of algorithms 708 may also include horizon leveling 710 algorithms that may level the horizon of the selected frame, edge determination 712 algorithms that determine endpoints of the frame that will serve as sides/edges of the panoramic image 132, distortion correction 714 algorithms that modify or remedy any distortions depicted in the selected frame, and/or contrast/color 716 algorithms that may adjust the contrast and/or the color of the selected frame.

Block 718 illustrates determining a panoramic image from the frame. After applying the set of algorithms with respect to the selected frame, the remote computing resources may generate the panoramic image 132 and transmit it to the user 104.

Figure 8:
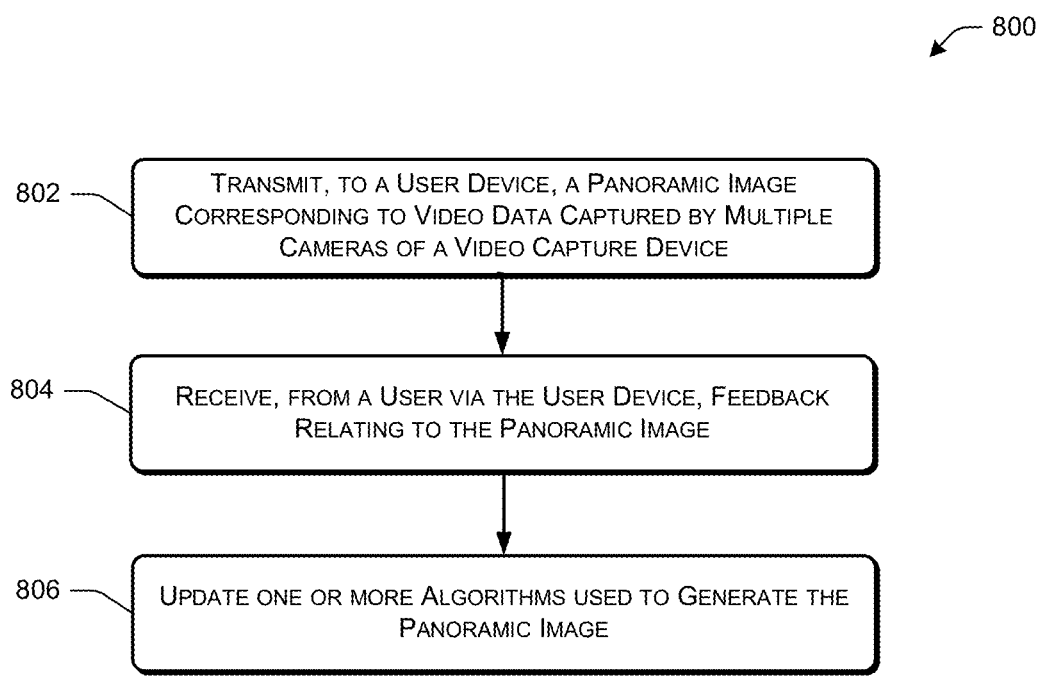
FIG. 8 is a flow diagram illustrating an example process of updating one or more algorithms utilized to generate a panoramic image based on user feedback relating to the panoramic image.

FIG. 8 is a flow diagram illustrating an example process 800 of utilizing feedback relating to a panoramic image to adjust one or more algorithms. Moreover, the following actions described with respect to FIG. 8 may be performed by the video capture device 102 and/or the remote computing resource(s) 108, as illustrated in, and described with respect to, FIGS. 1-3.

Block 802 illustrates transmitting, to a user device, a panoramic image corresponding to video data captured by multiple cameras of a video capture device. In various embodiments, the remote computing resources 108 may generate the panoramic image 132 from a frame selected from stitched video data 124.

Block 804 illustrates receiving, from a user via the user device, feedback relating to the panoramic image. In response to receiving the panoramic image 132, the user 104 may provide various feedback indicating that he/she liked the panoramic image 132, disliked the panoramic image 132, would like to receive one or more additional panoramic images 132, and/or would like modifications to the panoramic image 132.

Block 806 illustrates updating one or more algorithms used to generate the panoramic image. In various embodiments, based on the user feedback, the remote computing resources 108 may modify one or more variables or weights associated with the algorithms in order to increase the likelihood that subsequently generated panoramic images 132 are to be of interest to the user 104.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
memory;
one or more processors; and
one or more computer-executable instructions stored in the memory and executable by the one or more processors to perform operations comprising:
receiving feedback data related to a first image captured by a video capture device, the feedback data including an indication of an interest level associated with content depicted in the first image;
receiving, from a video capture device, stitched video data, the stitched video data depicting movement of one or more objects and being generated using a video stitching algorithm that combines:
first video data captured by a first camera of the video capture device,
second video data captured by a second camera of the video capture device,
third video data captured by a third camera of the video capture device, and
fourth video data captured by a fourth camera of the video capture device;
determining, using a first set of algorithms including at least one of an object detection algorithm or a motion detection algorithm, a first frame of the stitched video data, the first frame representing a first scene at a first time, the first scene including a representation of a person determined to be of interest based at least partly on the feedback data;
determining, using at least one algorithm from the first set of algorithms, a second frame of the stitched video data that is subsequent in time relative to the first time, the second frame depicting a second scene representing an event that is determined to be of interest based at least partly on the feedback data;
assigning a first interest value to the first frame, the first interest value being determined by determining an identity of the person and based at least partly on the person being determined to be of interest;
assigning a second interest value to the second frame, the second interest value being determined by identifying an object or an additional person associated with the event and based at least partly on the event being determined to be of interest;
determining that the first interest value is greater than the second interest value;
selecting the first frame;
determining a type of scene associated with the first scene represented in the first frame;
determining, based at least partly on the type of scene, a template to be applied to the first frame;
applying the template to the first frame;
generating, using a second set of algorithms, a second image from the first frame, the second set of algorithms including an edge detection algorithm that determines a first location within the first frame that serves as a first endpoint of the second image and a second location within the first frame that serves as a second endpoint of the second image to define which pixel values from the first frame to include in the second image; and
sending, to a mobile telephone, the second image.

2. The system as recited in claim 1, wherein the operations further comprise:
receiving, from the mobile telephone, second feedback data relating to the second image, the second feedback data including a request to modify at least one of the first endpoint or the second endpoint such that the second image depicts different content; and
using the edge detection algorithm to:
determine a third location within the first frame to serve as a third endpoint for a different image; and
determine a fourth location within the first frame to serve as a fourth endpoint for the different image, the third endpoint and the fourth endpoint to define different pixel values from the first frame to include in the different image; and
sending, to the mobile telephone, the different image.

3. The system as recited in claim 1, wherein the operations further comprise:
determining that the first frame depicts content included in a first field of view associated with the first camera; and
determining that the content is included in a second field of view associated with the second camera, the first camera being associated with a first axis of the video capture device that is approximately 90° from a second axis associated with the second camera.

4. The system of claim 1, wherein the indication of the interest level associated with the content depicted in the first image includes at least one of a first indication that a user likes the content, a second indication that the user dislikes the content, a third indication of a first request from the user to modify the content, or a fourth indication of a second request from the user for a different image.

5. The system as recited in claim 1, wherein the second set of algorithms include:
a horizon detection algorithm that:
determines first pixels from the first frame that represent a sky of the first scene;
determines second pixels from the first frame that represent a ground of the first scene;
determines a horizon of the first scene depicted in the first frame by determining a border between the first pixels and the second pixels; and
determines that a representation of the horizon in the first frame is uneven across the first frame and the second frame; and
a horizon leveling algorithm that rotates the first frame to level the first frame with the horizon.

6. A method comprising:
receiving feedback data related to a first image associated with a video capture device, the feedback data including an indication of an interest level associated with first content depicted the in first image;
determining stitched video data generated from first video data captured by a first camera of the video capture device and second video data captured by a second camera of the video capture device;
identifying, using at least a first algorithm, a first frame of the stitched video data representing second content determined to be of interest based at least partly on the feedback data;
identifying, using at least one of the first algorithm or a second algorithm, a second frame of the stitched video data representing third content determined to be of interest based at least partly on the feedback data;
determining a first interest value associated with the first frame based at least partly on the second content being determined to be of interest;
determining a second interest value associated with the second frame based at least partly on the third content being determined to be of interest;

determining that the first interest value is greater than the second interest value;

determining a type of scene associated with a scene depicted within the first frame;

determining a template to be applied to the first frame based at least partly on the type of scene; and generating a second image from the first frame.

7. The method as recited in claim 6, further comprising determining a first location within the first frame that serves as a first endpoint of the image and a second location within the first frame that serves as a second endpoint of the image.

8. The method as recited in claim 7, further comprising:
identifying a person depicted in the first frame; and
determining that the person depicted in the first frame is at a third location between the first location and the second location.

9. The method as recited in claim 6, further comprising:
sending, to a user device associated with a user account, the second image;
receiving, from the user device associated with the user account, second feedback data relating to the second image, the second feedback data including a request, from the user device, to send a different image that depicts the third content represented in the second frame; and
determining, based at least partly on the second feedback data, at least one of a variable or a weight associated with at least one of the first algorithm or the second algorithm.

10. The method as recited in claim 6, wherein the indication of the interest level associated with the content depicted in the first image includes at least one of a first indication that a user likes the content, a second indication that the user dislikes the content, a third indication of a first request from the user to modify the content, or a fourth indication of a second request from the user for a different image.

11. The method as recited in claim 6, further comprising:
determining a curve that includes multiple data points that comprise a first data point and a second data point, the first data point representative of a first interest value assigned to the first frame and the second data point representative of a second interest value assigned to the second frame;
determining that the first data point constitutes a local maxima of the curve; and
selecting the first frame based at least partly on the first data point constituting the local maxima of the curve.

12. The method as recited in claim 6, further comprising determining that the at least the first algorithm includes:
a horizon detection algorithm that:
determines first pixels from the first frame that represent a sky of the second content;
determines second pixels from the first frame that represent a ground of the second content;
determines a horizon associated with the second content by determining a border between the first pixels and the second pixels; and
determines that a representation of the horizon is uneven across the first frame and the second frame; and
a horizon leveling algorithm that levels the horizon by rotating the first frame.

13. The method as recited in claim 6, further comprising:
capturing the second video data using the second camera included in the video capture device;

capturing third video data using a third camera included in the video capture device;

capturing fourth video data using a fourth camera included in the video capture device;

determining the stitched video data based at least in part on the first video data, the second video data, the third video data, and the fourth video data; and identifying the first frame and the second frame from the stitched video data.

14. A system comprising:
memory;
one or more processors; and
one or more computer-executable instructions stored in the memory and executable by the one or more processors to perform operations comprising:
receiving feedback data related to a first image associated with a video capture device, the feedback data including an indication of an interest level associated with first content depicted the in first image;
determining stitched video data generated from first video data captured by a first camera of the video capture device and second video data captured by a second camera of the video capture device;
identifying, using at least a first algorithm, a first frame of the stitched video data representing second content determined to be of interest based at least partly on the feedback data;
identifying, using at least one of the first algorithm or a second algorithm, a second frame of the stitched video data representing third content determined to be of interest based at least partly on the feedback data;
determining a first interest value associated with the first frame based at least partly on the second content being determined to be of interest;
determining a second interest value associated with the second frame based at least partly on the third content being determined to be of interest;
selecting the first frame based at least partly on a determination that the first interest value is greater than a threshold value;
determining a type of scene associated with a scene depicted within the first frame;
determining a template to be applied to the first frame based at least partly on the type of scene; and
generating, a second image from the first frame.

15. The system as recited in claim 14, wherein the first camera is associated with a first axis of the video capture device that is approximately 90° from a second axis associated with the second camera, and wherein the operations further comprise:
determining a first field of view associated with the first camera;
determining a second field of view associated with the second camera; and
determining that the first frame depicts an object that is included in the first field of view and the second field of view.

16. The system as recited in claim 14, wherein the operations further comprise:
determining, using a human detection algorithm, that an individual is depicted in the first frame;
determining, using a face detection algorithm, that a face of the individual is oriented in a first direction; and
determining a first location within the first frame that serves as a first endpoint of the second image and a second location within the first frame that services as a second endpoint of the second image such that the individual is depicted in the second image.

17. The system as recited in claim 14, wherein the operations further comprise:

determining a first time stamp associated with the first frame;

identifying a third frame of the stitched video data having a second time stamp that is prior to the first time stamp;

identifying a fourth frame of the stitched video data having a third time stamp that is subsequent to the first time stamp; and generating the second image based at least partly on at least one of fourth content depicted in the third frame or fifth content depicted in the fourth frame.

18. The system as recited in claim 14, wherein the operations further comprise:

sending, to a user device associated with a user account, the second image;

receiving, from the user device associated with the user account, second feedback data relating to the second image, the second feedback data including a request being received from the user device; and at least one of:

modifying at least one of a first endpoint or a second endpoint associated with the second image based at least partly on the second feedback data; or sending one or more additional images to the user device associated with the user account, the one or more additional images being generated from the second frame.

19. The system as recited in claim 14, wherein the operations further comprise:

determining a curve that includes multiple data points that comprise a first data point and a second data point, the first data point representative of a first interest value assigned to the first frame and the second data point representative of a second interest value assigned to the second frame;

determining that the first data point constitutes a local maxima of the curve; and selecting the first frame based at least partly on the first data point constituting the local maxima of the curve.

20. The system as recited in claim 14, wherein the indication of the interest level associated with the content depicted in the first image includes at least one of a first indication that a user likes the content, a second indication that the user dislikes the content, a third indication of a first request from the user to modify the content, or a fourth indication of a second request from the user for a different image.

* * * * *